US009028323B2

(12) United States Patent
Tharp

(10) Patent No.: US 9,028,323 B2

(45) Date of Patent: May 12, 2015

(54) SYSTEM AND METHOD FOR BETTING

(71) Applicant: David John Bowman Tharp, Surrey (GB)

(72) Inventor: David John Bowman Tharp, Surrey (GB)

(*) Notice: Subject to any disclaimer, the term of this patent is extended or adjusted under 35 U.S.C. 154(b) by 74 days.

(21) Appl. No.: 13/630,449

(22) Filed: Sep. 28, 2012

(65) Prior Publication Data

US 2013/0090157 A1 Apr. 11, 2013

Related U.S. Application Data

(63) Continuation of application No. PCT/EP2011/055148, filed on Apr. 1, 2011.

(30) Foreign Application Priority Data

Apr. 1, 2010 (GB) .................................. 1005585.3

(51) Int. Cl.

*G06F 17/00* (2006.01)

*G07F 17/32* (2006.01)

(52) U.S. Cl.

CPC ............ *G07F 17/3288* (2013.01); *G07F 17/32* (2013.01); *G07F 17/3209* (2013.01); *G07F 17/3276* (2013.01)

(58) Field of Classification Search

USPC ...................................................... 463/16–26

See application file for complete search history.

(56) References Cited

U.S. PATENT DOCUMENTS

| | | | | |
|---|---|---|---|---|
| 8,342,942 | B2 * | 1/2013 | Amaitis et al. | 463/25 |
| 8,353,763 | B2 * | 1/2013 | Amaitis et al. | 463/28 |
| 2001/0032169 | A1 | 10/2001 | Sireau | |
| 2002/0068633 | A1 | 6/2002 | Schlaifer | |
| 2007/0250510 | A1 | 10/2007 | Nachman | |
| 2008/0113816 | A1 | 5/2008 | Mahaffey et al. | |

FOREIGN PATENT DOCUMENTS

| | | |
|---|---|---|
| WO | 2007006083 | 1/2007 |
| WO | WO 2010/014667 A2 | 2/2010 |

OTHER PUBLICATIONS

"Match Analysis with Pavilion" from PitchPad http://www.pitchpad.com/matchview.htm.

"Table Top Cricket" http://www.miniclip.com/games/tabletop-cricket/en/.

International Search Report of International Application No. PCT/EP2011/055148 dated Jun. 30, 2011.

* cited by examiner

*Primary Examiner* — Ronald Laneau

(74) *Attorney, Agent, or Firm* — Newman Law, LLC

(57) ABSTRACT

In various aspects there are provided a system, method, and an apparatus for playing a betting game in conjunction with the play of a sporting event. The apparatus may include a system and/or a computer program product for playing a better game, such as roulette, which may be played in combination with watching a sporting event, such as cricket. Related methods, systems, apparatus, and/or articles are also described.

34 Claims, 16 Drawing Sheets

Processing Drawing

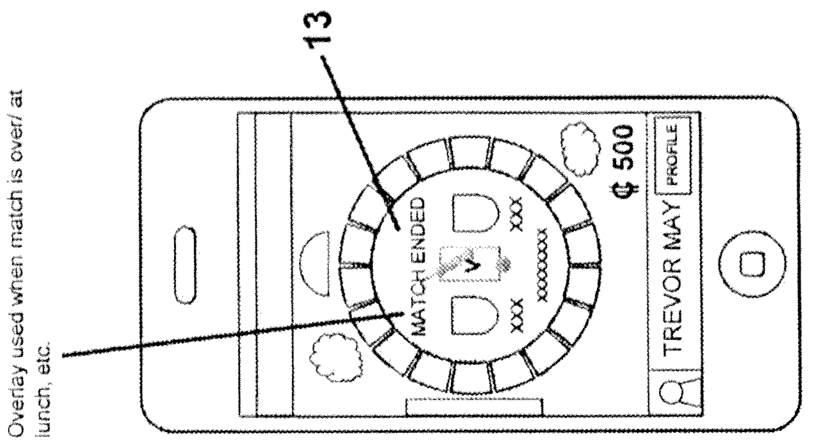
FIG. 10
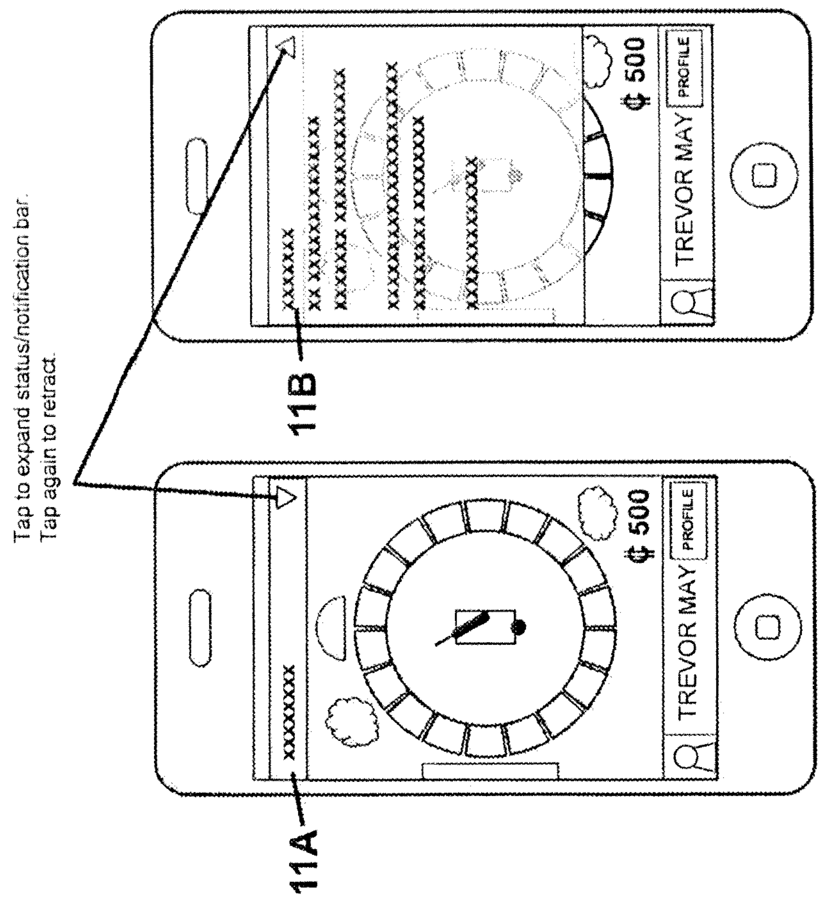
FIG. 9A
FIG. 9B

Multiplayer "player" area

SYSTEM AND METHOD FOR BETTING

FIELD

This disclosure relates generally to a system and method for betting on a game, more particularly, to betting on a game wherein the bet corresponds to a result in a sporting event, such as cricket match.

BACKGROUND

Betting on the outcome of events has increased dramatically in popularity over the years. The outcome of events has importance both commercially in business and socially for entertainment. Sport in particular has increased in popularity over the years. Sports matches are now regularly attended and viewed by many either in person or via TV or computer based media.

Amongst the most popular sporting events viewed include cricket, rugby, football, baseball, field hockey, ice hockey, basketball, darts, motor racing, sailing, cycling. American football, golf, tennis, field and track athletics, snooker and basketball.

All sports include as a basis a competition either between competitors or between an individual and pre-defined goal. One such popular sporting game is cricket. Cricket is a team sport played with a bat and a ball on a cricket field, which is in the shape of an oval. The teams include eleven players a side. A first team bats, and tries to score runs, while an opposing team bowls and fields, trying to get the first team dismissed. The key action takes place on the "pitch." The pitch is the central most part of the field that has been specially prepared. It is rectangular, about 22 yards in length, and at each end are placed "wickets." The wickets are placed behind a boundary termed the "crease" and include three vertical stumps positioned apart from one another and two horizontal bails, which are positioned on top of and in between the stumps. The wicket serves as a target for the bowler, e.g., pitcher, of the fielding side and are defended by the batter of the batting side. The bowler from the fielding side attempts to throw the ball at the wicket in such a manner that the ball displaces the bails from the stumps. The primary concern of the batsman is to guard the wicket and prevent the ball from hitting the wicket. In addition to protecting the wicket, the secondary concern of the batsman is to score runs by hitting the ball with his bat so that he has time to run from one end of the pitch to the other before the fielding side can return the ball.

A run may be scored in two ways. A run may be scored when the batsman hits the ball and has subsequently run the length of the pitch. A run may also be scored when the batter hits the ball in a manner that it reaches the boundary of the field. If a hit ball does cross the boundary the batting team is automatically awarded runs. Four runs are scored if the ball touches the ground en route to the boundary, and six runs are scored if the ball clears the boundary in the air without touching the ground on route. The batsman does not need to run if the ball reaches or crosses the boundary. The bowling side seeks to dismiss the batsmen by various means until the batting side is all out, whereupon the side that was bowling takes its turn to bat and the side that was batting must take the field. Winning the game is achieved by scoring the most runs.

Another such popular sport is Golf. Players aim to navigate through a round of 18 holes in the lowest number of shots. Each hole is shaped differently and of different lengths comprising a tee, a fairway and a green. Each hole is situated on a green, on which the player uses a putter to roll the ball into the hole. The green can be of different shapes with dips and bumps and its grass is cut closely.

Another such popular sport is Motor Racing. Forms of racing could include bikes or cars in a number of different forms such as touring cars, formula 1/2/3 & 4, super bikes etc. Teams nominate drivers to drive the bikes and cars around tracks that form unique patterns. A race will be of a certain length or number of laps and drivers compete to win the race and the corresponding points for such a win. Each lap time is recorded by computer and is shown to the team and spectators. During such a race drivers will briefly interrupt the race and come into an area known as the pits. Here the team's mechanics can refuel the bike or car, change parts of the bike or car and fix any parts before sending the driver back out onto the track.

Another such popular sport is baseball. Baseball is a bat-and-ball sport played between two teams of nine players each. The goal is to score runs by hitting a thrown ball with a bat and touching a series of four bases arranged at the corners of a ninety-foot square, or diamond. Players on one team (the batting team) take turns hitting against the pitcher of the other team (the fielding team), which tries to stop them from scoring runs by getting hitters out in any of several ways. A player on the batting team can stop at any of the bases and later advance via a teammate's hit or other means. The teams switch between batting and fielding whenever the fielding team records three outs. One turn at bat for each team constitutes an inning and nine innings make up a professional game. The team with the most runs at the end of the game wins. If a player hits the ball over the fence inside of the foul lines it is known as a home run and means the player can run all four bases to score one run.

Also popular is roulette. Roulette is a casino game. It involves a wheel that is demarcated with pockets that are both numbers and colours which alternate between red and black (although other colour combinations are also possible). A croupier spins the wheel in one direction and spins a ball in the opposite direction around a tilted circular track running around the circumference of the wheel. In the game, players may choose to place bets on either a number, a range of numbers, the colours red or black, or whether the number is odd or even. The ball eventually loses momentum and falls on to the wheel and into one of the coloured and numbered pockets on the wheel.

Typically, roulette players make one or more of a variety of bets, which bet attempts to predict into which pocket the ball will land. For instance, along with the spinning wheel, roulette is played with a roulette table upon which is a two-dimensional, rectangular representation of the numbers on the roulette wheel. Generally, there are two types of bets that can be made: inside and outside bets. Inside bets include straight up bets, split bets, street bets, corner bets, six line bets, and trio bets. A straight-up bet is one or more single number bets, wherein the bet is placed by selecting a single number pocket, which bet predicts the number of the pocket the ball falls into. A split bet a bet placed on two adjoining numbers, wherein the bet is placed by selecting adjoining numbers on the roulette table. A street bet is a bet on three numbers. A corner (or square) is a bet on the corner of four numbers. A six line bet is a bet on a line of six numbers on the table. A trio is a bet on an intersecting point. Outside bets include a bet on a number between one to eighteen or a number between nineteen and thirty six. Other outside bets include a bet on either red or black, even or odd, or dozen bets, such as a bet on the first (1-12), second (13-24), or third group (25-36) of twelve numbers. A column bet may also be made, wherein a bet is placed on all 12 numbers on any of three vertical lines of numbers on the table.

As described above both cricket and roulette are popular games watched and/or played independently. A computerised system and method for combining the two games together would be useful. This would allow improved player functionality and a more interactive and sociable experience. The provision of such a computerised system may also be useful as a training device to assist in teaching potential players of the sport which shots are considered hardest to place by virtue of the odds associated with them or to assess statistically which shots players most prefer to make. Accordingly, the present disclosure is directed to a system, method and apparatus for playing a betting game, such as roulette, wherein the bet corresponds to a result in a sporting event, such as a cricket match.

As discussed above, whilst various methods for placing bets exist, all depend on the bet being placed far enough ahead of the event to allow the bets to be collated and placed. It would be desirable to provide a means and method of allowing bets to be placed in "real time" alongside an event to allow for a more ongoing and interactive experience. This would have a number of advantages including more regular placing of bets therefore allowing a continuous user system and a greater involvement in the result generated by the event etc.

SUMMARY

The subject matter disclosed herein provides a computerised system and a method for performing a betting game, such as roulette, which may be played in combination with an event for which an outcome can be bet on. In one such embodiment of the invention as provided herein there is provided a computer program for use in a betting game which is played in combination with a sporting event. In one such embodiment the sporting event is cricket, rugby, football, baseball, field hockey, ice hockey, basketball, darts, motor racing, sailing, cycling. American football, golf, tennis, field and track athletics, snooker, basketball. In one embodiment of the invention as described herein the sport is cricket, motor racing golf or baseball. In a further embodiment the sport is cricket.

According to a first aspect of the invention, there is provided a computer-implemented apparatus for running a betting game in which users can bet on a micro-event which occurs during a sporting event, the apparatus comprising: a feed content receiver and transformer arranged to receive micro-event data in real time relating to a sporting event, which sporting event involves the repeated occurrence of a micro-event in variable regions of a field of play and the micro-event data comprising data fields relating to each individual occurrence and including an identification of an actual region of the field of play where the micro-event occurs; an adjudicator arranged to determine a result of the micro-event using the micro-event data and a set of stored rules; and a client-side module arranged to: receive bet-placing data from one or more users, the bet-placing data identifying a given individual occurrence of a micro-event and a bet type that are associated with a region of the field of play; compare said received bet data with said determined result and to identify given bet data as constituting a winning bet if the bet type corresponds to the actual region of the field of play in the micro-event data for said given individual occurrence or else to identify said bet data as constituting a losing bet.

Preferably, the apparatus further comprises a feed collator arranged to: determine whether a complete set of data relating to the micro-event has been received and if any data is missing, request the missing data; and receive any requested missing data. Preferably the feed collator is further arranged to: determine whether any duplicate data relating to the micro-event has been received and if any has been received, process to leave remaining data; and collate the remaining data and any received missing data. Thus the adjudicator can be arranged to use the collated micro-event data.

Suitably the feed content receiver and transformer comprises: a feed listener arranged to receive micro-event data from a data feed when new micro-event data is available; and a feed puller arranged to poll a data feed for new micro-event data. The feed listener is preferably arranged to receive micro-event data from a data feed at regular intervals determined by a data source providing data through the data feed. The feed puller is preferably arranged to poll a data feed at regular time intervals. Suitably the feed puller is arranged to poll a data feed at times which differ from the times at which the feed listener is arranged to receive micro-event data. Advantageously the feed collator is arranged to transmit data to the adjudicator.

Preferably the feed content receiver and transformer is arranged to receive data from multiple data sources and transform the data into a common format for use by the feed collator. Suitably the feed collator is further arranged to determine whether received micro-event data relates to a result of a micro-event and if it does, send collated data for that micro-event to the adjudicator and otherwise send it to the client-side module with an indication that bets can be re-opened for the next micro-event. Advantageously the feed collator is arranged to use bet-placing data or information derived therefrom in the said determination.

The stored rules used by the adjudicator can comprise rules relating to reliability of a data source. Advantageously the adjudicator is arranged to continually or at intervals update the rules in dependence on the quality of data received from a data source.

Preferably the client-side module is arranged to accept bet-placing data in respect of a next micro-event prior the occurrence of the next micro-event and to determine when betting for the next micro-event is closed. Suitably the client-side module is further arranged to apply a bet to the next micro-event if betting for that micro-event is still open or otherwise to apply the bet to a subsequent micro-event. Advantageously the client-side module is arranged to provide bet-placing data or information derived therefrom to the feed collator and to use data provided from the adjudicator or the feed collator to determine whether to re-open an existing bet or to open a new bet for the next micro-event. The client-side module can be further arranged to manage odds data for the betting game and to continually or at intervals update the odds data in dependence on any of: the number and type of bets placed; and in response to changing conditions of the sporting event. Such changing conditions of the sporting event comprise any of the weather, characteristics of the participants of a micro-event, and the ground conditions pertaining to a particular micro-event.

Preferably the client-side module is further arranged to send a message to each user via a user device, informing whether a bet placed was a winning or a losing bet. The client-side module can also be further arranged to manage an account for each user, including storing a representation of credit associated with each user and increasing or decreasing the credit in response to a winning or a losing bet respectively. The apparatus can also be provided with a query function through which the client-side module can receive and request information regarding a micro-event.

Advantageously the apparatus comprises an archive database arranged to store result data from multiple micro-events of multiple sporting events and bet data of one or more users.

The event is usually a sporting event. In one embodiment the server is configured for receiving data in real time relating to both an event (outcome data) and bet-placing data (user data) from said clients.

The said client application can provide a user interface. The client application is suitably hosted on a client device which can be any suitable device for generating and/or displaying a generated page at a user interface. In one embodiment of the invention as described herein the client device is selected from but not limited to a computer, an electronic game console, a telephone, a smart phone such as an iPhone or Android phone, a personal data assistant (PDA) such as a Blackberry a Television or other monitor such as touchscreens. Other such devices known in the art may also be considered. In one such embodiment the client application is run using television or online using the Internet or using mobile connectivity such as 3G, wireless, Ethernet or broadband connectivity.

The client application can be configured for receiving user entered data, processing said data and storing said data. In addition the client application acts as a data provider to transmit said user data to the server.

The server may be implemented as one or more processors and/or computers and/or memories The client application may be coupled to the server through a network of computers via a wireless or wired Internet or mobile network. In one embodiment the computerised system as herein described includes at least one processor and at least one memory.

In a further embodiment the server is able to provide operations. For example one such operation is the generation of a page for presentation at the user interface. For example in a specific embodiment the operation provides a page including a representation of a cricket field and a boundary that is divided into one or more segments.

In one embodiment the number of segments which a boundary is divided into is at least 4, or at least 6 or is at least 8 or is at least 10 or is at least 12, or is at least 16 or is at least 18 or is at least 20 or is at least 50.

In one embodiment of the invention as described herein the event is a sports event. In a further embodiment the sports event is cricket, rugby, motor racing or golf. In a specific embodiment of the invention the sports event is cricket.

The client application can be considered to work as a data provider to transmit user data. The user data may pertain to a prediction as to whether an event has been deemed to have occurred and an amount to be wagered on whether said event has occurred. If a plurality of outcomes is available the bet data may additionally include a differing level of odds according to the possible outcomes which may be achieved.

For example in one such embodiment a possible outcome is that a projectile will cross the boundary at a particular segment and an amount to be wagered on such an event occurring can be made. If a plurality of segments are provided, than the user data may additionally include a prediction pertaining to which segment of the boundary the projectile will cross. For instance, the boundary may comprise a circumference having a plurality of segments arranged along the boundary. In one embodiment the segments are of equal size. In yet another embodiment the segments are not equal in size. The boundary may be overlaid upon a field of play and each of the segments may include a predefined value, such as a value that represents the probability that the projectile will cross that segment. For example, the predefined value may represent the odds that the projectile will cross into the segment as against all of the other segments. In certain instances, the segments may be numbered and alternatively coloured so as to resemble a roulette wheel, and may further be configured such that if a projectile crosses the segment the segment is triggered so as to indicate that the projectile crossed that segment.

In one embodiment of the invention as herein describe the feed content receiver and transformer comprises a feed listener and feed puller.

In an alternative embodiment the computerised system provides an authentication and authorization system to restrict user access. Users can connect to the betting server over a number of client devices which hosts the client application via the internet, iPhone or other devices to place, review and collect their bets.

In one such embodiment the computerised system provides the ability for users to create player profiles and account creation and registration services to support initial user setup. A password is required for security and communication is sent via secure means.

In a further embodiment of the invention as described herein the user interface may be provided at a single or a plurality of clients. In a preferred embodiment the user interface is provided as a plurality of clients. Where a plurality of clients is provided the server compiles the user data of the clients and generates odds data pertaining to a predicted outcome selected by both clients. Hence, the odds data is representative of a weight given to the bet of one client over that given to another client. The weight of the actual outcome data provided by a data provider may also be weighted. For instance, where the actual outcome data pertains to a designation of a given outcome, the actual outcome data provided by the data provider may be weighted according to whether the designated outcome actually occurred or not. For example, if the predicted outcome does actually occur, more weight may be given to a future designation by that data provider. However, if the predicted outcome does not actually occur, less weight may be given to a future designation by the data provider. Where a plurality of data providers is provided, the data providers may be ranked according to the weight attributed to their outcome data.

In yet a further embodiment the event involves the projection of at least one object by one or more players in a variable direction relative to a field of play towards a boundary of said field of play, and said outcome data comprises data fields relating to each individual projection, including an actual portion of the boundary where the object crosses said boundary.

In one embodiment the sport is baseball and the said repeated occurrence of a micro-event is a home run being hit and the said region of the field of play is a portion of the fence.

In another embodiment the sport is golf and the said repeated occurrence of a micro-event is a ball being hit onto the putting green and the said region of the field of play is an area of the green.

In yet another embodiment the sport is horseracing and the said repeated occurrence of a micro-event is a horse arriving or falling and the said region of the field of play is the end of a furlong or a fence.

For each sporting event, the game can generate a representation of the ground where the game takes place and the boundary of the ground is organised into segments. Such segments can be equal or different in size. In one embodiment the segments are of equal size. The number of segments can be varied. In one embodiment the boundary is divided into at least 2 segments, or at least 6 segments or at least 8 segments or at least 10 segments or at least 12 segments or at least 16 segments or at least 18 segments or at least 20 segments or at least 24 segments or at least 40 segments or at least 50 segments. In one such embodiment the boundary is divided into 18 segments.

In one embodiment the event is cricket. For each ball bowled the odds change to reflect the immediate players who will affect the outcome of the score. We achieve this by taking each first class cricketer's cricketing statistics and creating a persona for each person. This includes their handedness (left/right hand batsman/bowler), where he bats, bowls and what style of cricketer he is. So for example, Strauss is a left hand opening batsman and Swann is a right hand spin bowler.

The players' data is then taken from the facing batsman, non-facing batsman, batsman about to come in, ball number in the over and current bowler. The blend of these stats will then produce a set of odds according to the number of segments the boundary is divided into. For example in one embodiment a set of 18 odds is produced, which are automatically displayed on the client device.

Players can place bets at any point throughout the game on any number of segments. Their bets stay on until there is a boundary (ie. Players are betting on the next boundary event and not just what might happen to the next ball). If a user wanted to bet on a number of segments simultaneously the game allows the player to swipe a larger area and the odds within each of the segments selected will merge and a new lower odd will be displayed in the centre of the game for the player to either accept or reject.

At any point where a player has selected to place a bet the game will offer a number of standard stakes to be wagered. These can be either monetary or points based on which type of game is being played (Play for Free or Play for Money).

Each player has a wallet that will keep constant track of their winnings and losings. This updates in real time and their result will be presented to the user in their own profile page and on a variety of leaderboards. Throughout the game, players can keep up to date with the score, and ball-by-ball commentary.

Players can compete with others on either the global leaderboard which includes all players on any platform, current match leaderboard which only takes those players who are active for any given game or a closed leaderboard for private play.

On the occasion where there are two or more live sports matches ongoing at the same time, players of Roulette Cricket can bet on multiple games at the same time. Their wallet will keep up to date with all bets regardless of which game the player is watching at any time The data provider sends the bet data to a server to determine if the bet is won or lost. For instance, determining if a bet is won or lost will include the server receiving the user data as well as receiving the outcome data and comparing the user data with the outcome data so as to generate a result, wherein the result is determinative of whether the bet is won or lost. The outcome data may be provided to the server by a data provider, such as by a reporting agency, which reporting agency reports whether an event has occurred. Once a bet is won or lost, the method may further include making a payout if the bet is won, and receiving a payment if the bet is lost.

In yet a further embodiment each client device is configured to transmit said user data to the server, said user data identifying a given individual projection and bet type that is associated with one or more portions of the boundary. The said server may comprise an adjudicator configured to compare said bet data received from said clients with said outcome data received by said adjudicator and to identify given user data as constituting a winning bet if the bet type corresponds to the actual portion of the boundary in the outcome data for said given individual projection or else to identify said bet data as constituting a losing bet.

Thus the invention also relates to a computerised system for playing a betting game, comprising the apparatus as previously described and a plurality of game clients, wherein each game client is arranged to transmit said bet data to the apparatus, said bet data identifying a given individual micro-event and bet type that is associated with one or more regions of the field of play. The system can further comprise one or more data sources arranged to send micro-event data to the apparatus.

In another interrelated aspect, a computer readable medium is provided. The computer readable medium may contain code, which when executed by a processor provides operations. The operations provided include generating a page for presentation at a user interface. For instance, where the page includes a representation of a cricket field and a boundary that is divided into one or more segments. The operations further include providing the generated page.

The computer-readable medium can comprise a program which can be executed to implement the following steps to run a betting game in which users can bet on a micro-event which occurs during a sporting event: receiving micro-event data in real time relating to a sporting event, which sporting event involves the repeated occurrence of a micro-event in variable regions of a field of play and the micro-event data comprising data fields relating to each individual occurrence and including an identification of an actual region of the field of play where the micro-event occurs; determining a result of the micro-event using the micro-event data and a set of stored rules; receiving bet-placing data from one or more users, the bet-placing data identifying a given individual occurrence of a micro-event and a bet type that are associated with a region of the field of play; and comparing said received bet data with said result to identify given bet data as constituting a winning bet if the bet type corresponds to the actual region of the field of play in the micro-event data for said given individual occurrence or else to identify said bet data as constituting a losing bet.

Accordingly, the implementation of the methods of the disclosure may include: the use of one or more clients and/or one or more data providers (which may comprise one or more of a computer, an electronic game counsel, a telephone, a personal data assistant (PDA), or the like), upon which the generated page is displayed; a server, and/or a network connecting the client and/or data provider to the server. Hence, articles are described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

In one aspect, a method is provided. The method includes generating a page for presentation as at an interface, such as a user interface. The page includes a representation of a spoiling event to be played for example a cricket field and a boundary wherein the boundary is divided into one or more segments. The method further includes providing the generated page, for instance, at the user interface. The user interface may be provided at one or more clients, such as a game client, which client may additionally be configured for receiving user input, for instance, input pertaining to a bet.

The method of running a betting game in which users can bet on a micro-event which occurs during a sporting event, can also comprise: receiving micro-event data in real time relating to a sporting event, which sporting event involves the repeated occurrence of a micro-event in variable regions of a field of play and the micro-event data comprising data fields relating to each individual occurrence and including an identification of an actual region of the field of play where the micro-event occurs; determining a result of the micro-event using the micro-event data and a set of stored rules; receiving bet-placing data from one or more users, the bet-placing data identifying a given individual occurrence of a micro-event and a bet type that are associated with a region of the field of play; and comparing said received bet data with said result to identify given bet data as constituting a winning bet if the bet type corresponds to the actual region of the field of play in the micro-event data for said given individual occurrence or else to identify said bet data as constituting a losing bet.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

Preferred embodiments of the invention now be described in detail with reference to the accompanying drawings in which:

FIGS. 5A-5C, 6A-6F, 7, 8, 9A-9B, 10, 11, 12A-12G, 13, 14 depict an exemplary client including a user interface displaying various pages that have been generated by the game client.

Like reference symbols in the various drawings indicate like elements.

DETAILED DESCRIPTION OF PREFERRED EMBODIMENTS

Figure 1B:
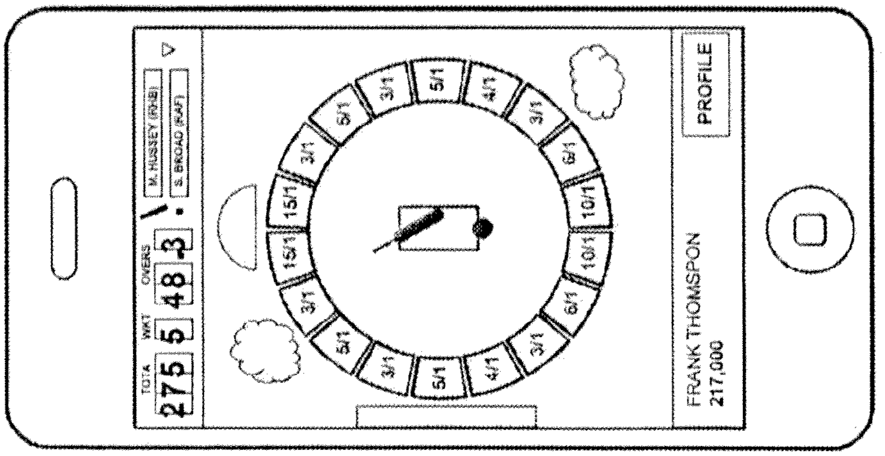
FIG. 1A-B illustrates a representation at a page of the disclosure including a cricket field overlaid with a boundary, wherein the boundary is divided into segments.
Figure 1A:
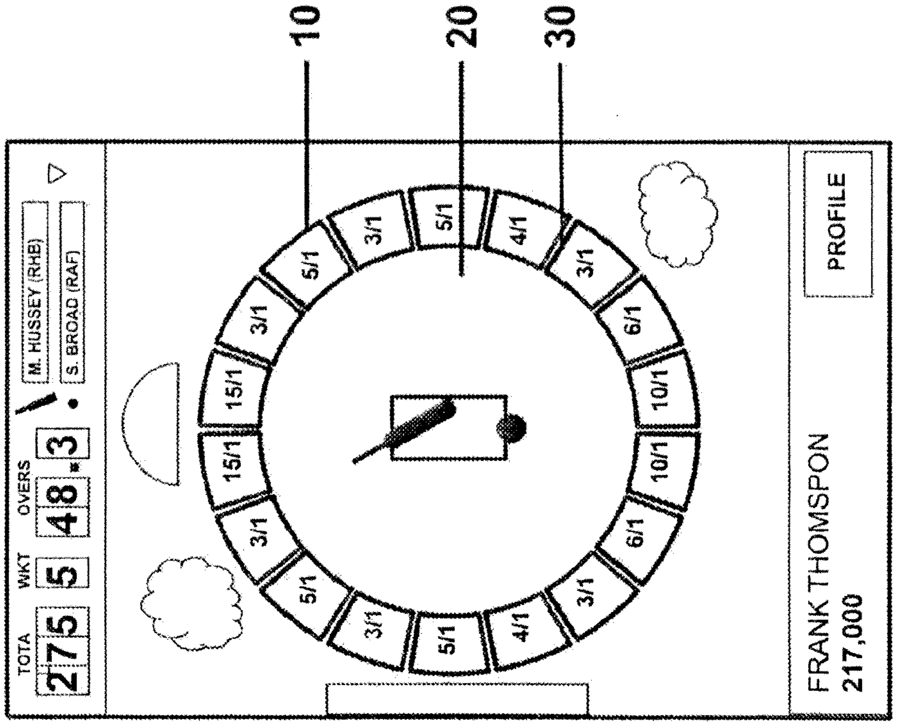

The subject matter described herein relates to the playing of a betting game and, more particularly, to the playing of a betting game wherein the bet corresponds to a result in a sporting event, such as cricket match. In one aspect there is provided a method. The method may include generating a page for presentation at a user interface. As can be seen with respect to FIG. 1A-B, the page may include a representation of a field 10, such as a cricket field, upon which a match is played, such as a cricket match. FIG. 1A relates to the screen whereas FIG. 1B depicts the same screen as hosted on a client device. At least a portion of the field may be divided from another portion of the field by a boundary, thereby forming a playing portion 20 and a boundary portion 30 of the field. The boundary portion may further be divided into segments, as shown. For instance, the field may be a cricket field and the boundary portion of the field may be segmented, numbered, and/or coloured so as to resemble a roulette wheel. The method may further include providing the generated page at the user interface 112 of a client device 110.

Figure 2:
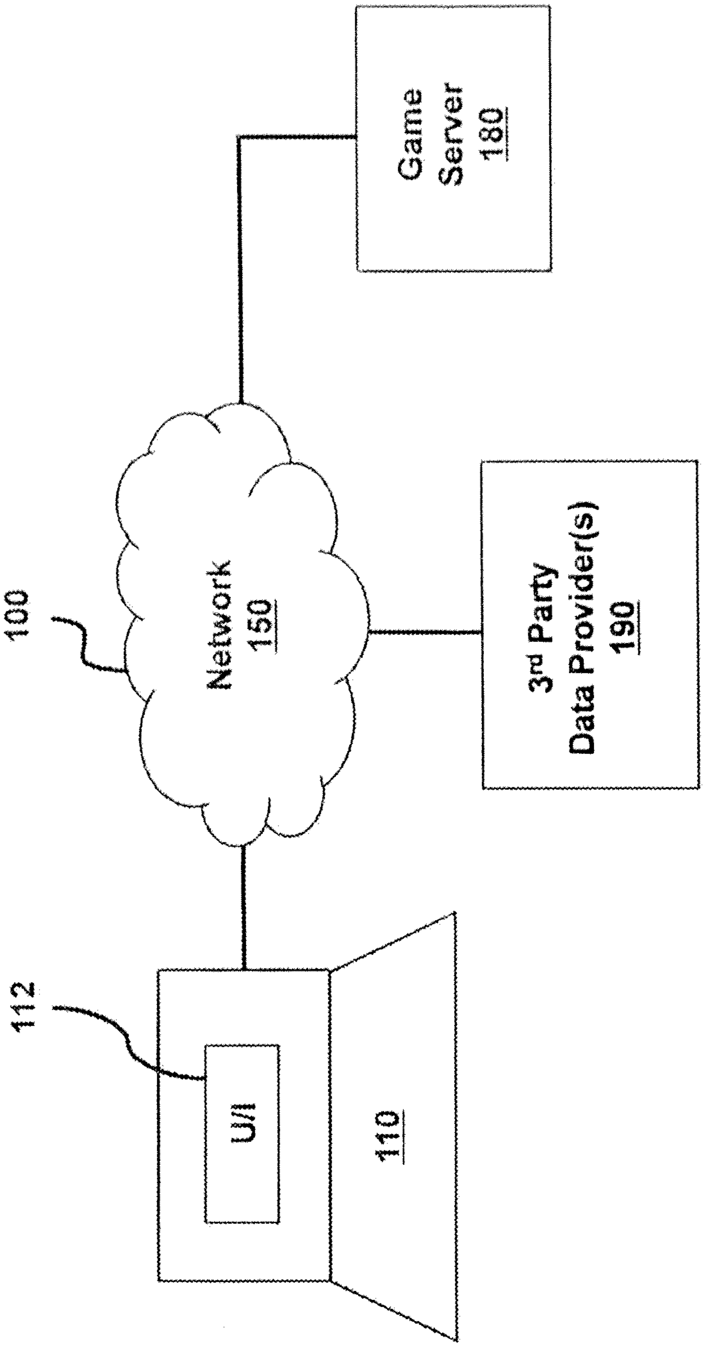
FIG. 2 illustrates an example of a system 100 for playing cricket roulette.

FIG. 2 depicts an exemplary system 100 for playing a betting game. The system includes a client device 110, having a user interface 112, a network 150, a server 180, and includes one or more data providers 190. The game client device 110 includes a user interface 112 for presenting a page, which page may include a representation of a cricket field that is overlaid with a representation of a roulette wheel, as shown in FIGS. 1A and 1B. The client 110 may be implemented as a processor including a computer, an electronic game console, a phone, a personal data assistant (FDA), and the like. The client 110 may include one or more of a processor, a memory associated with the processor, a receiver, transmitter, a network interface, data entry mechanism, a display, and the like.

A suitable data entry mechanism may be any suitable mechanism for transmitting data, such as data entered by a user, to a memory of the device or an associated server. For instance, the data entry mechanism may be a keyboard, mini keyboard, touchpad, voice recognition device, touch screen display, and the like. For example, in certain instances the game client device 110 includes a touch-screen display wherein the display presents a representation of a generated keyboard wherein data may be entered into the devices by touching or tapping on the representation of the keys. In certain instances, the data to be entered is in response to a query elicited from the client, such as a request for user information made by the client, and displayed at the display of the game client. The display may be of any suitable shape or size, such as a flat panel, LCD, LED, type of display. An exemplary elicitation may be, for instance, one or more of a request for user personal information, account information, a user preference, a user designation, a method of game play, a user selection, a user confirmation, and the like. In one exemplary instance, the user input data, such as selection data, includes one or more of a bet or a request for information from the game client 100. The client device 110 may be configured for receiving user entered data including initiating a game and placing bet data processing, storing the same, and/or transmitting that data to the server system 180.

Accordingly, in one instance, the client 110, such as a suitable game device, is provided wherein the game device is configured for displaying a game interface. Specifically, the game device is configured for generating a representation of a sporting field, such as a cricket field, upon which field a match, such as a cricket match, is to be played; and further configured for proving that representation to the game interface associated there with, for instance at a display thereof. The representation of the field includes at least one boundary that separates the field into at least two portions at least one portion of which is divided into segments. For example, the field may be a cricket field the outer circumference of which forms a boundary portion, wherein the boundary portion is divided into segments, such as depicted in FIG. 1.

The segments typically cover an equal amount of area, and thus the boundary is equally divided into segments. However, in certain instances, the segments may not cover an equal amount of area, and thus, the boundary may not be equally divided. Each segment may represent a predetermined value. The predetermined value, for instance, may represent the probability that a hit projectile will cross that segment and/or may reflect a payout if the hit projectile actually crosses that segment, which payout may be based upon the determined probability. See, for instance, FIG. 1A-B. The predetermined value may represent a simple calculation as to the probability that the projectile will cross a given segment divided by the total number of possible segments that the projectile could cross; or may be a more complex calculation taking into account one or more of the teams playing, statistics pertaining to the thrower, statistics pertaining to the batsman, the quality of the pitch, the quality of the field, the conditions of the field, the conditions of the weather, the time of the day, the time of the game, and the like, any of which can affect the probability that a hit projectile will cross a given segment of the boundary. Thus, in certain instances, the predefined value further represents the calculated odds that the hit projectile will cross into the segment as against all other segments. In one instance, if a hit projectile actually crosses the segment the segment may be triggered, such as by lighting up, flashing, changing colour, and the like.

The game device 110 may further be configured receiving bet data from a user, such as bet data pertaining to a prediction as to which segment of the boundary a hit projectile will cross, for instance during play of the game, as well as an amount to be wagered; and configured for transmitting the bet data to the server 180. The sender 180, therefore is configured for receiving the data from the game client 110, via the network 150 such as the internet.

The system 100 includes a server 180, as indicated above. The server 180 may be implemented as one or more processors, such as a computer, a server, and the like. For instance, the server 180 may include one or more of a processor, a memory associated with the processor, a receiver, a transmitter, a network interface, a data entry mechanism, a display and the like. The client is coupled to the server 180 through a network 150. Detailed operation of the server 180 will be discussed below with respect to FIG. 15.

The system 100 additionally includes a data provider 190 that is also coupled to the server 180 through the network 150. A data provider may be any suitable device capable of transmitting data, such as data pertaining to a result of a sporting match to the system 100, such as those commonly known in the art, including a computer, an electronic game council, a phone, a personal data assistant (PDA), and the like. The data provider 190 may include one or more of a processor, a memory associated with the processor, a receiver, a transmitter, a data entry mechanism, a display, and the like. The network may be any suitable mechanism for connecting one or both of the client 110 and the data provider 190 to the server 180, such as an intranet or an internet (which may include wired and/or wireless links).

The data provider may be operated by an individual, for example an individual watching a sporting event. It may also be operated by a commercial data provider, e.g. Crickbuzz or by the sports ground itself. The data can be obtained by various means such as human observation or multiple cameras distributed around the sports ground whose images are captured and processed into a data stream which can be picked up by a data provider such as those exampled above.

Figure 3:
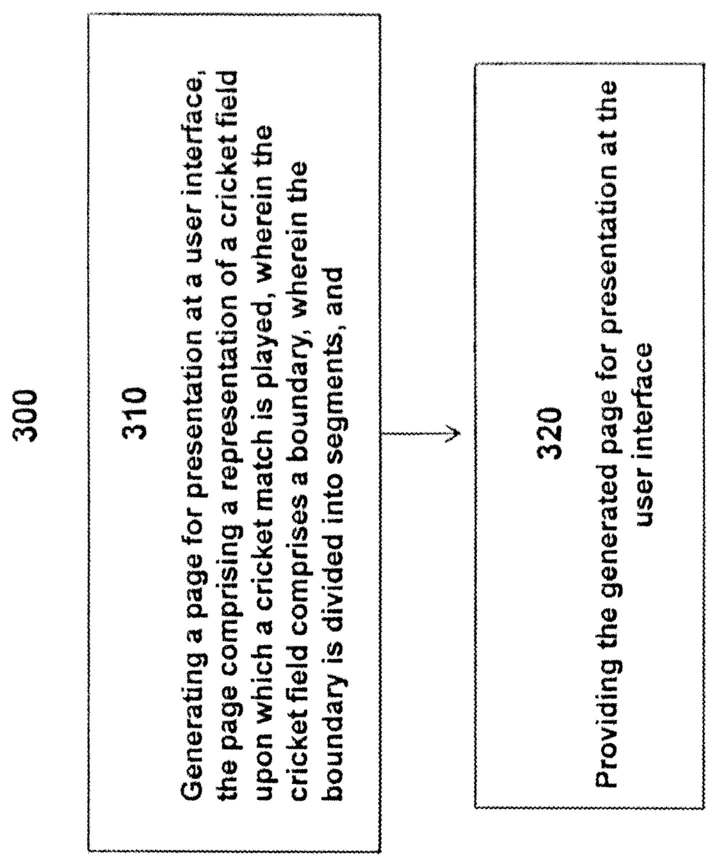
FIG. 3 depicts a process 300 for generating the page of FIG. 1.

FIG. 3 provides an illustration of the process 300 for generating a page at a user interface provided by the server 180. At 310 the process includes generating a page, for instance, a page that includes a representation of a playing field upon which a sporting game may be played. For example, the page may include a cricket field that is representative of a cricket field upon which a cricket match is being, has been, or is to be played. The depicted cricket field or other sports field is overlaid with a representation of a boundary, such as a boundary that has been divided up equally or unequally into segments. The segments may be representative of a corresponding patch of field upon which the actual cricket match is played. At 320 the generated page is provided at the user interface and a user therefore may interact with the generated page so as to place a bet. For example, the segments of the boundary overlaying the cricket field may represent a possible outcome of a play of the game.

Specifically, each segment may represent the possibility that a hit projectile will cross into that segment during the play of the game. Accordingly, a user may make a prediction and a bet as to which of the segments a hit projectile will cross, such as by selecting a given segment and wager amount. As indicated above, the segments may be numbered and/or coloured in any suitable manner, for instance, in a manner so as to resemble a roulette wheel.

Figure 4:
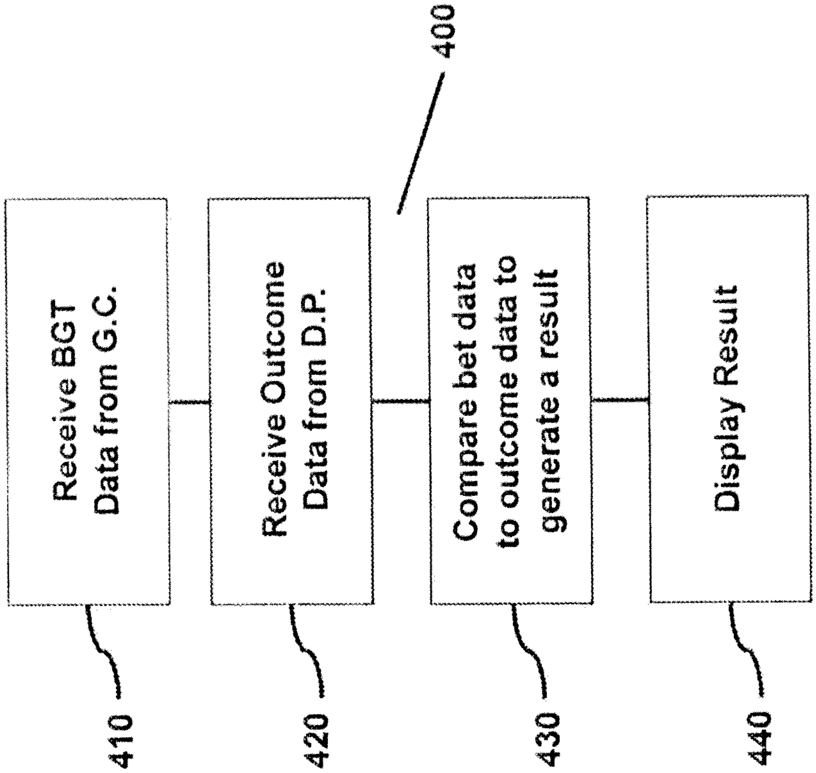
FIG. 4 depicts a process for determining whether a bet is won or lost.

FIG. 4 depicts a process 400 for playing the electronic betting game. The process includes the receiving of one or more of bet and/or result data and the using of that data in determining whether a bet is won or lost. In a given instance, the betting game may be structured in a manner similar to roulette wherein bets are made, and the game may be played in such a manner that a result in a sporting match is determinative of whether the bet is won or lost. In certain instances, an exemplary sporting match that may be played and/or watched in combination with the betting aspect of the game may be cricket and an exemplary result is the location on the boundary (and hence a segment of the boundary) which a boundary is hit to. However, it is understood that the game may be played in association with any sporting match that takes place on a field having a boundary over which a ball must pass so as to register a score, such as baseball, soccer, football, and the like.

For instance, at 410, bet data is received at the server 180 from a client, such as game client 110. At 420, outcome data is received at the server system 180 from a 3rd party data provider, such as data provider 190. Accordingly, in one instance, a data provider 190 is provided wherein the data provider is configured for receiving, storing, and/or transmitting data to the server system 180. For instance, a data provider may be any suitable source of information provider so long as they are capable of making a determination, predicted, computed, actual, or otherwise, regarding whether and where an object, such as a hit or kicked ball, crosses a boundary.

For example, the data provider 190 may be configured for supplying to the server system 180 actual outcome data that is related to the actual segment of the boundary the struck projectile crosses. This information may be transmitted via an electronic device, such as a computer, telephone, game counsel. PDA, and the like. In one exemplary instance, the data provider 190 may include a computerized and/or handheld device through which actual outcome data is provided either directly or indirectly to the server system.

Accordingly, the data provider 190 may be configured similar to the client 110, however, instead of bet data being entered therein, actual (e.g. observed) outcome data is entered and/or transmitted to the server. For instance, the data provider may be configured for generating and displaying a page at a data provider user interface, wherein the generated page includes a representation of a game field as described above. However, with respect to the data provider, the data to be input into the data provider, and/or transmitted thereby, is primarily directed not to a bet pertaining to a prediction of where a hit projectile will cross the boundary, but rather to an estimation as to where the hit projectile actually crosses the boundary, and as such, the entered data is actual outcome data. "Actual outcome data," as used in this manner, may mean a predicted, approximated (e.g., observed) outcome or an actual computer generated outcome of a result. For instance, the data provider may make a prediction as to the outcome of an event (such as a ball crossing the boundary), which prediction is based on an observation or a calculation, or the data provider may make a determination based on one or more sensors that are configured for conclusively determining the outcome of the event. For example, the data provider may use a combination of camera data and calculations based on knowledge of the ground. In either instance, the data provider is configured for providing that data as outcome data to the server system 180.

At 430, the bet data from 410 is compared to the outcome data at 420 so as to generate a result. For instance, the server 180 may include a processor that includes programming configured for compiling data obtained from one or more clients 110 and/or one or more data providers 190, comparing the same, and generating an outcome in accordance with one or more rules of the system. This is described in more detail below with respect to FIG. 15.

At 440, the results generated at 430 may then be transmitted and/or displayed, for instance at one or more of a display of the server system, the game client, and/or the data provider.

As described herein with reference to FIGS. 2 and 4, a single client, a single data provider, and a single server have been set forth. However, it is understood that a plurality of clients, data providers, and/or servers may be provided. For instance, where a plurality of clients and/or data providers are provided, the server may include programming adapted to weight one or more of the bet and the actual outcome data.

For example, where a plurality of clients are provided the server 180 may be configured for processing and compiling the bet data so as to generate odds data, which odds data may then be provided to one or more of the server, the clients, and/or the data provider. In one instance, the odds data may be related to a weight given to particular bet data obtained from one client over the weight given to a bet obtained from another client. In such an instance, the odds data may pertain to the outcome provided, e.g., selected, by more than one client. The server may generate such odds data, or a client itself may generate odds data.

Additionally, where a plurality of data providers are provided the server may be configured for compiling and weighting the input from one data provider against another data provider. For instance, where the actual outcome data provided by a particular data provider pertains to an estimation of a given outcome, such as where a projectile crosses a boundary, the provided data may be weighted by the system server. The data may be weighted according to whether the estimated outcome comports with what actually happens, i.e., where the projectile actually crosses the boundary. Accordingly, if the estimated, e.g., predicted, outcome does actually occur, more weight is given to a future designation by that data provider, however, if the predicted outcome does not actually occur, less weight is given to the future data provided by that particular data provider. Hence, where a plurality of data providers are provided, they may be ranked according to the weight attributed to their outcome data. An accuracy rating of each individual data provider, each individual game client, a collection of data providers, and/or a collection of game clients may be generated, e.g., based on the compiled data, by the server system 180.

Accordingly, the server 180 may be configured for compiling the data provided by the data providers and not only determining whether a bet is won or lost, but also for ranking the data providers and/or success of the individual users operating the client devices, e.g., betters. The compiling of the data provided by the data providers may include weighting the data, ranking the data providers or users, and generating an accuracy rating based on the compiled data. Hence, with respect to the data provider data, the server system may use the compiled data to generate an overall predicted outcome of play of a game and/or an overall accuracy rating associated therewith, such as an accuracy rating that pertains to the percentage of times that the overall predicted outcome of play corresponds with an actual outcome of play. Further details of these functions will be described below with respect to FIG. 15.

It is further to be noted that as described the betting game is played in conjunction with the concurrent play of an underlying sporting match, such as a cricket match. However, it is not necessary that the underlying sporting match actually be played concurrently. For instance, the underlying sporting match may be a game that has been played in the past, the results of which have been electronically stored, or may be a simulation of a game to be played in the future, the results of which are calculated and/or predicted by use of a computer. In other embodiments, the underlying game may simply be a simulation of a game that is generated and played out by a computer.

FIGS. 5-15 provide an exemplary aspect of how a betting game may be played in accordance with the methods and apparatuses of the disclosure. It is to be understood that although a particular exemplary embodiment is set forth herein, the method and apparatuses described may be different and/or be configured in a different manner.

Accordingly, in one instance, a game client 500 is provided, which is a specific embodiment of the game client 110 depicted in FIG. 2. In this instance, the game client 500 is configured as a processor (e.g., a computerized, personal data assistant), having a display 502. The display 502 is configured for both displaying received and/or generated information, and further configured for receiving user input. For instance, the display is configured for touch-screen data entry. The device may further include a navigation tool 504. Although a navigation tool is provided as element 504, the touch screen display may further be configured to provide touch screen navigation, so as to allow a user to navigate from one screen page to another either via the navigation tool or via direct interaction with the screen. In certain implementations, the navigation tool or the touch screen functionality need not be included.

In accordance with the methods of the disclosure, the game client 500 is configured for generating one or more pages. As can be seen with respect to FIG. 5A, the game may be played in a single player mode 506 or a multiplayer mode 508.

Accordingly, in a first instance, the game client may generate a first page, e.g., 502, which page requests the user to select a single player mode 506, a multiplayer mode 508, and/or to provide user information 512 to the system. The request for user information may include any user pertinent information, such as user identification information, login pass-word information, account information, monetary information, or other information that may be used to identify a given user, to place a bet, and the like. This or another page may also allow the user to request information 510A, such as instructions pertaining to how to play the game or news related information 510B.

Figures 5A, 5B, 5C:
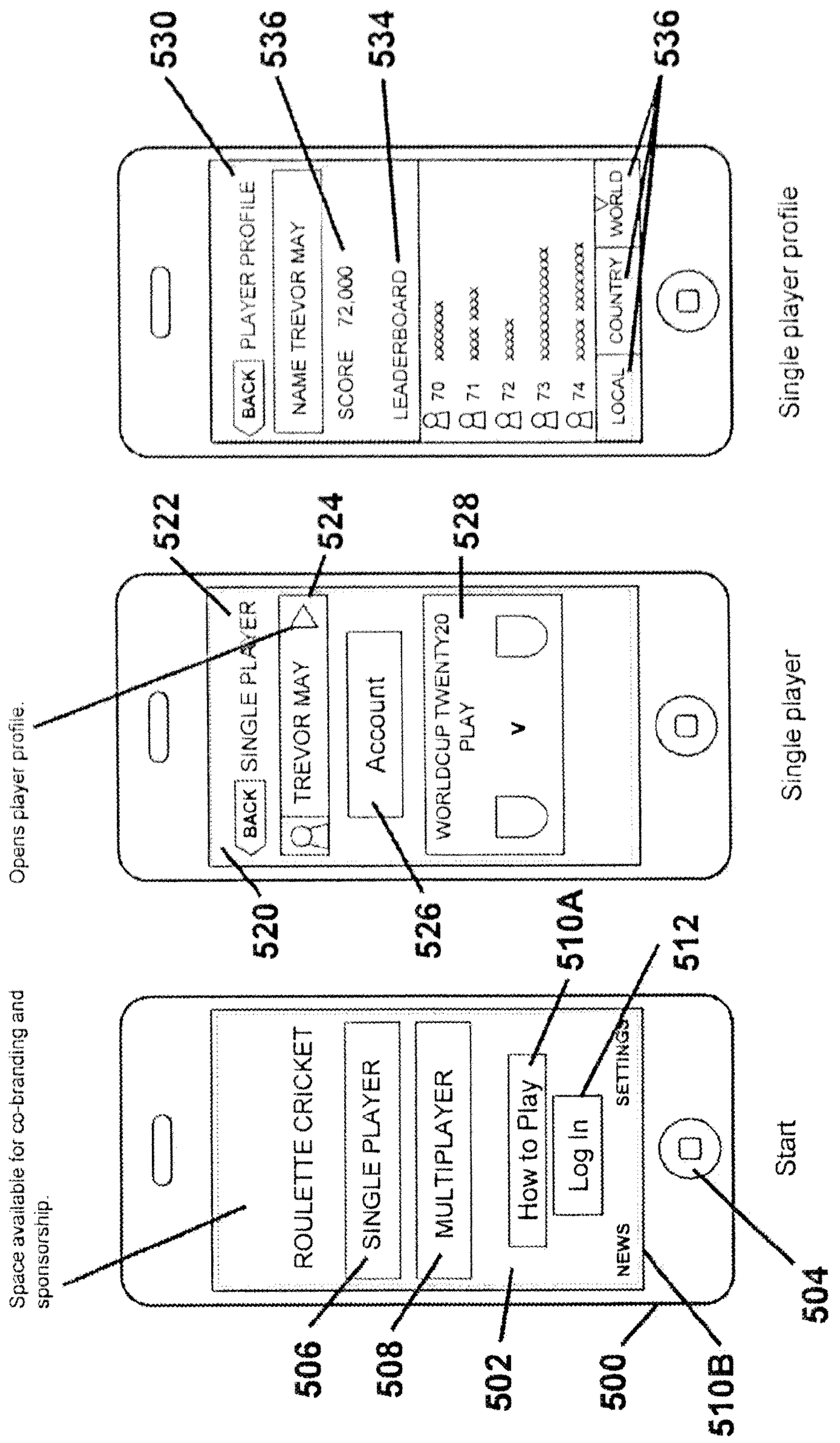

As can be seen with respect to FIG. 5B, once a particular account has been set up and/or a player mode selected by a user, a user's personal account screen 520 may be generated and presented by the game client 500. It is to be noted that the data pertaining to an individual user's account may be stored locally in a memory of the game client and/or on the server system. The user's personal account screen 520 may include information pertaining to the mode of play 522, the player identification 524, and account information 526, and information pertaining to one or more games 528, 536, such as one or more cricket games, currently being played (e.g., locally, in a given country, or globally), which games may be accessed, and bet upon by the game user and/or information pertaining to the game requested. Once a game is selected, the selected game may be presented at this or another page as well.

From this, or another screen, see for instance FIG. 5C, one or more player profiles 530 may be accessed, which player profiles may include information as to a given game client user's historic data, e.g., use data, statistics data, and/or personal information. For instance, the statistics data of the individual user or of other game players may be accessed. In certain instances, a rank or leader board data 534 may be presented. It is to be noted that where a given screen identifies other game client users, that user's information, including statistics, profile, e-mail address, etc. may be accessed, and in certain instances, that user may be communicated with, for instance, by messaging, phoning, or the like, such as by tapping on or otherwise selecting the particular users identification. A game client user's personal score 536 may also be presented at this or another page.

Once a game client's user account has been set up and a game to be bet on selected, such as a cricket match currently being played or to be played, the game client device 500 generates a graphical representation of a game field, having a representation of segmented boundaries overlaid thereon, which graphical representation is provided to a user interface of the game client device 500 for display to a user. As can be seen with reference to FIG. 6A-F, in certain instances, the underlying sporting match being played is cricket but the system could work with other sports or events.

In this instance, a representation of a cricket field 10 is provided, which representation may include a pitch 3, a field of play 20, and a boundary 30, wherein one or more portions of the field may be overlaid with a roulette wheel. In this manner the field, or more particularly the boundary, may be divided into segments. It is to be understood that the underlying sporting event need not be cricket but may be any suitable sporting event, such as baseball, soccer, football, and the like with accommodating changes being made to the graphical representation of the field and boundaries. In such an instance, a complete or partial roulette wheel, or other mechanism for dividing the field and/or boundaries into segments, may also be provided, e.g., graphically.

Figures 6A, 6B, 6C:
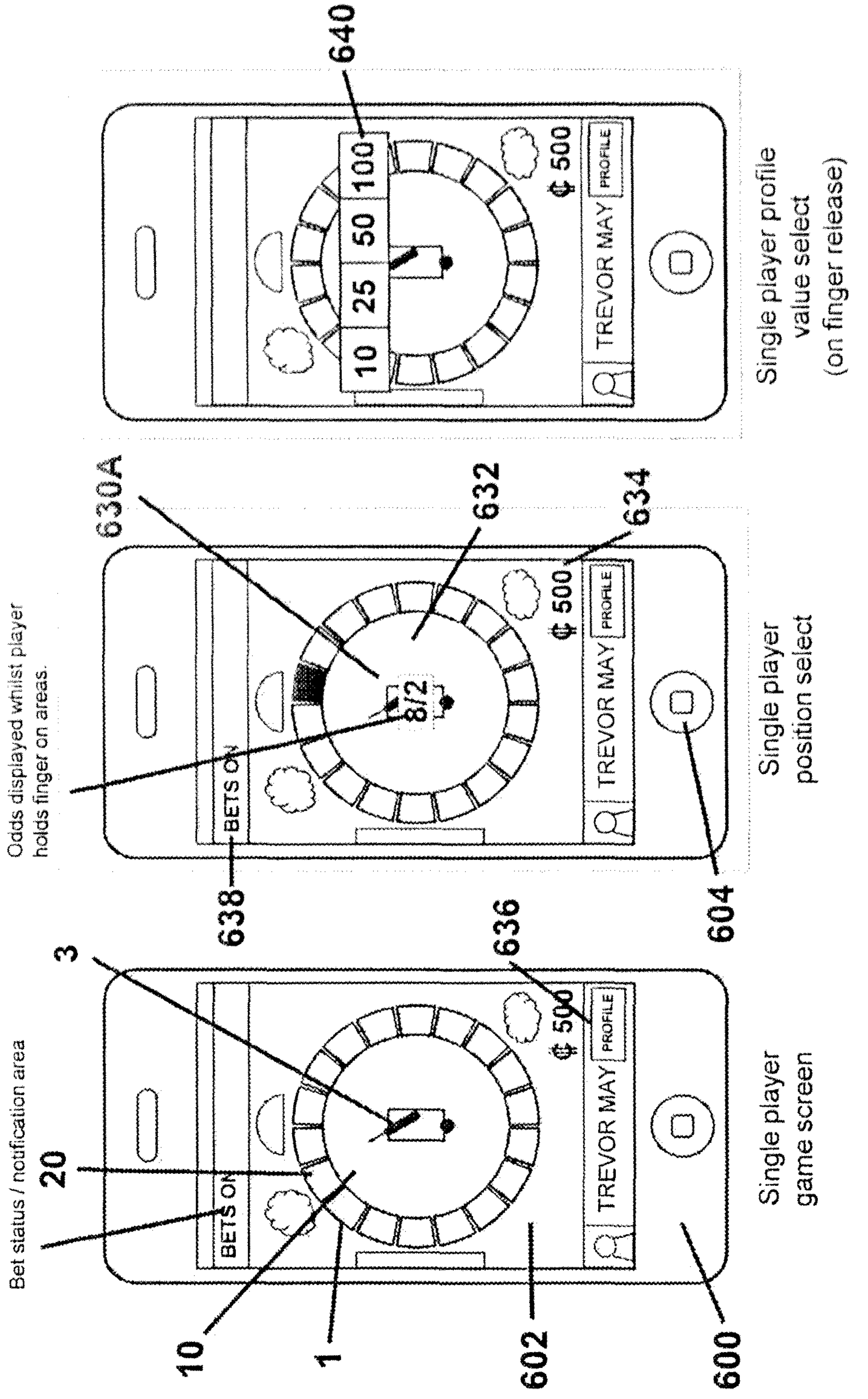

FIG. 6A presents a rendition of such a page 602 displaying a graphical user interface that may be provided to the client 600. A graphical interface such as this may be employed by a user of the game client 600 so as to make a bet, for instance, by selecting a segment of the boundary 30 a predicted projectile will cross when hit; and to place a wager in association with that prediction. Accordingly, FIG. 6A presents a typical betting screen 602, wherein a user can interact with the screen 602 of the display so as to place a bet, for instance, by selecting a portion, e.g., a segment, of the boundary over which the user predicts a hit projectile will cross, as well as entering an amount to be wagered thereon. The screen 602 may also display one or more navigation keys so as to facilitate the navigation to other screens such as a player profile screen button 636 or a bet status button 636.

As shown in FIG. 6B, a user may select a given segment, such as 630A, upon which to place a bet, for instance, by either using a toggle 604 or by tapping the touch screen at the selected segment. Once a selected segment has been demarcated odds data 632 pertaining to the chance that the hit projectile will cross that segment of the boundary may be displayed. Further, bet data 634 pertaining to an amount that is to be wagered may be entered and displayed. As can be seen with respect to FIG. 6C, once a bet has been placed, a player profile value select box 640 may be displayed.

Figures 6D, 6E, 6F:
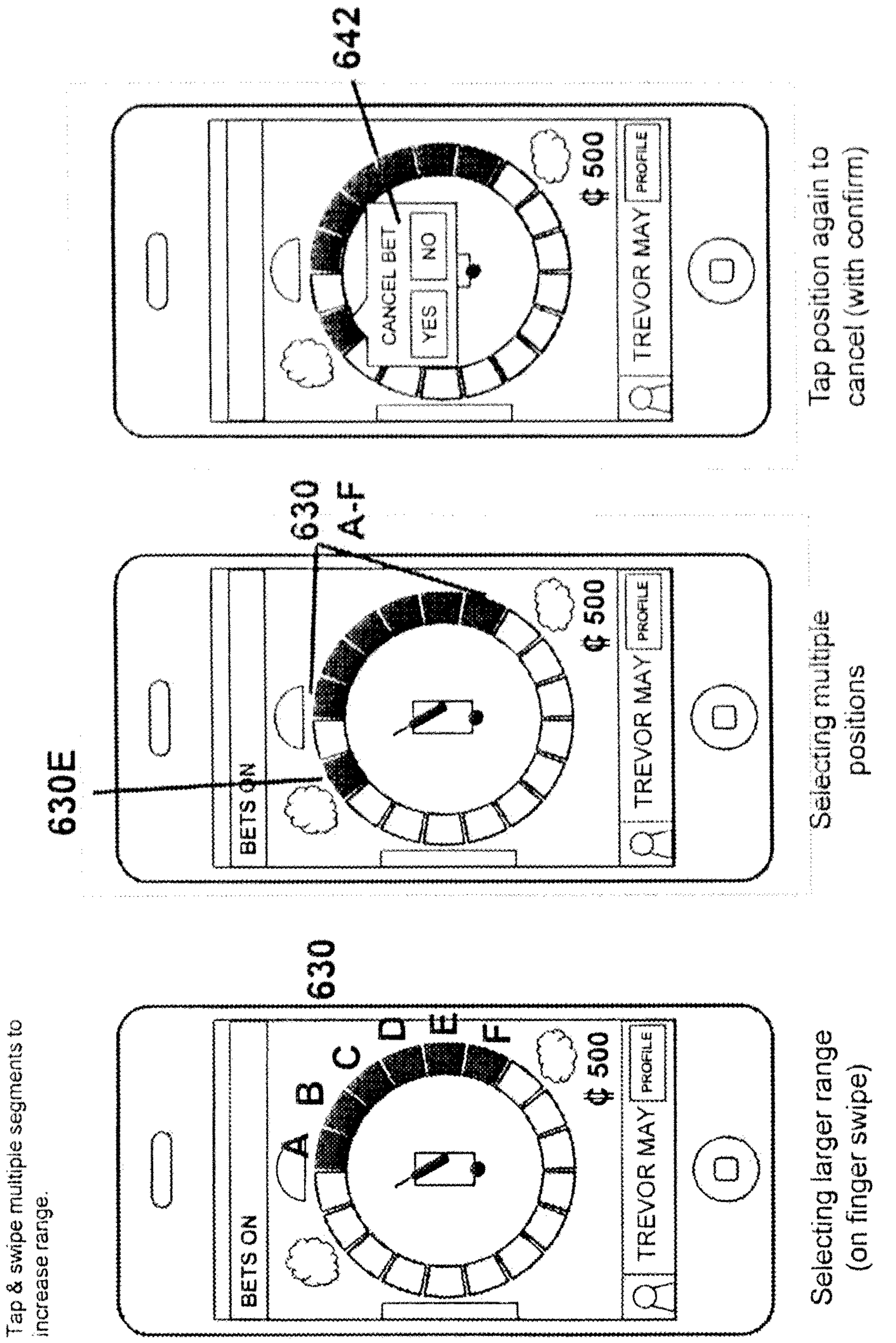

FIG. 6D-6F illustrate various types of bets that may be made, for instance, by tapping and/or swiping on multiple segments of the screen and/or using the toggle to do the same. In such a manner one or a plurality of segments, such as 630A-F, may be selected and demarcated as a potential bet designator. As seen with respect to FIG. 6E, a plurality of segments may be selected, for instance, where the segments are adjoining, such as 630D, or not adjoining, such as 630E. In a manner such as this, several different types of bets may be made and outcome data determined in relation thereto. For instance, a bet pertaining to a predicted outcome may be made. The bet may be of whether a batsman actually hits a projectile for a given throw, e.g., bowl, or whether the batsman will be able to hit the projectile over any boundary generally or a specific boundary specifically. In such an instance, actual outcome data will pertain to whether the batter actually hits the projectile, whether if hit the projectile crosses a boundary, and may further pertain to which specific boundary the hit projectile crosses. This actual outcome data may then be provided to the game client 500 for display there at. Additionally, the segments may alternatively be designated into two groups, and a bet pertaining to which group the projectile when hit crosses may be made. In such an instance, the actual outcome data will pertain to whether or not the hit projectile crosses into a boundary of the selected group. The segments may also be numbered and a bet may be placed on one or more numbers or on “odds” or “evens.” In such an instance, the actual outcome data will pertain to whether or not the hit projectile crosses into a boundary of the segment with the selected number or “odds” or “even” group. As set forth above, the game server 180 determines whether a bet is won or lost by comparing the bet data as to the predicted outcome from the game client with the actual outcome data provided by the data provider(s) and generates an outcome result as to whether a bet is won or lost and/or an outcome result as to whether the projectile is hit and crosses a boundary and if so over which boundary the hit projectile crosses. This information may then be provided for display by the game server 180, game client 500, and/or data provider 190. Accordingly, the ball by ball trajectory may be mapped graphically, for instance, at the client interface, throughout the course of the game so as to track the game's progress. An accuracy rating for any given batter may also be displayed.

As can be seen with respect to FIG. 6F, once one or more segments have been selected and demarcated, a bet confirmation screen 642 may be displayed so as to confirm the user selected segment(s). In a manner similar to this, an amount to be wagered may be entered and confirmed. Bets are made before the projectile is bowled and therefore at a given period of time before the projectile is bowled or otherwise thrown the betting window is closed. The bets and/or predicted results of one or more users may then be displayed prior to the projectile being thrown and prior to the results of the batsman and the reporting thereof by the data provider.

Figure 13:
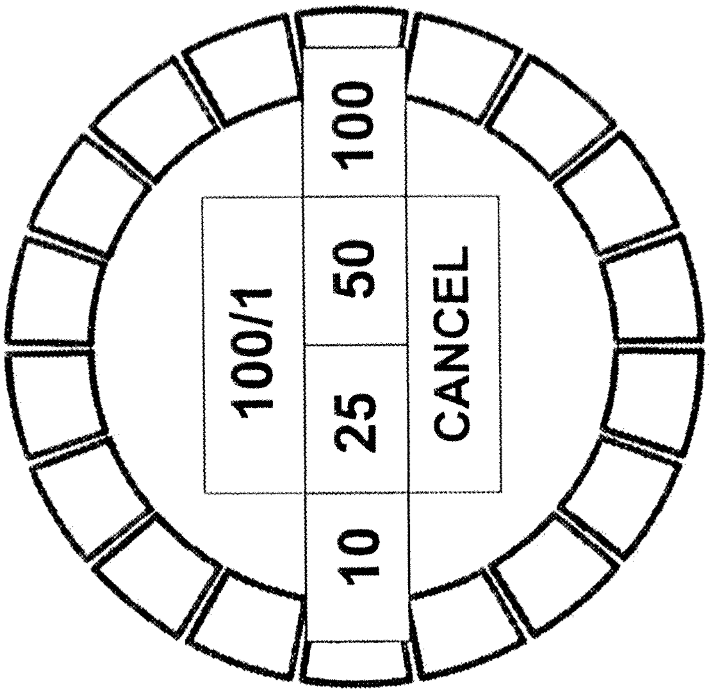

FIG. 13 illustrates that once a player has selected a segment or multiple segments an indicator will appear giving the user the odds for the selection and the choice to select the amount of credits or real money the player would wish to select. The player also has the opportunity to cancel the selection, which if pressed will return the user to the game screen FIG. 6A.

Figure 7:
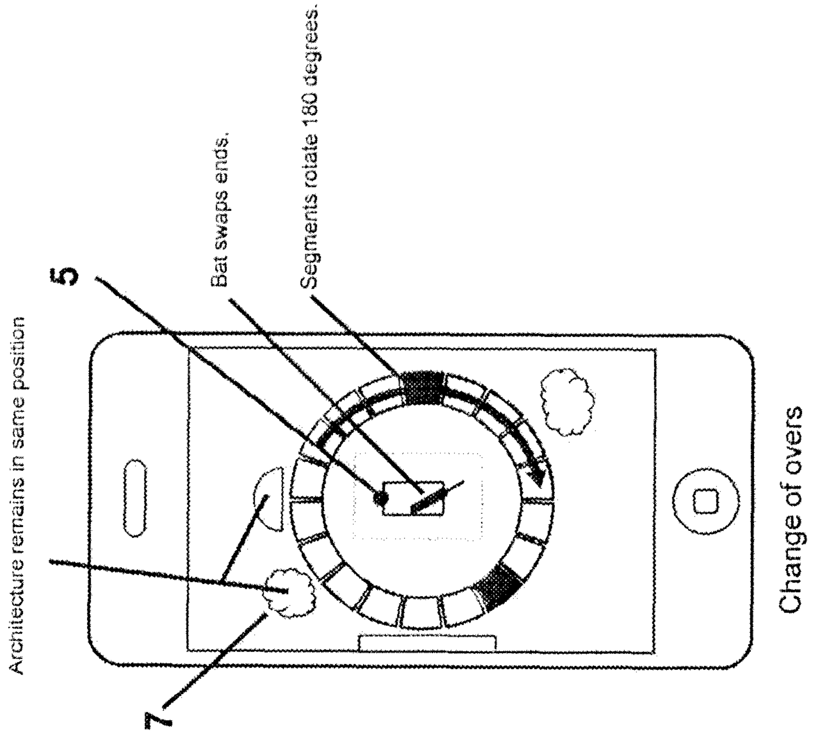
Figure 8:
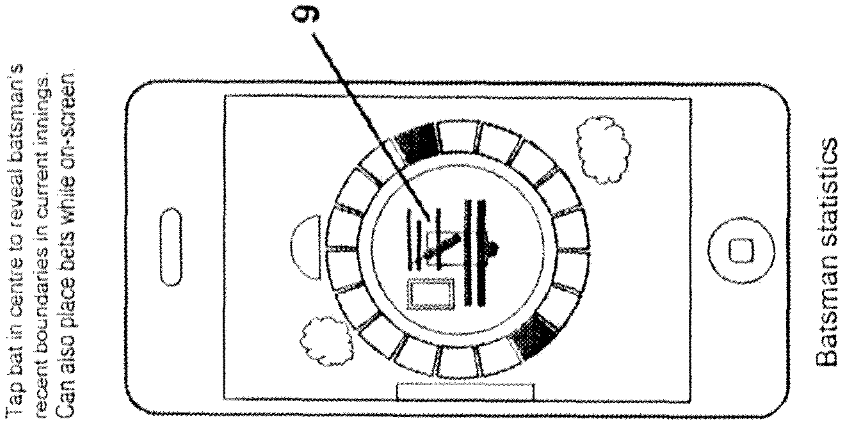

With respect to the game of cricket, and as illustrated in FIG. 7, a batsman, represented as a bat 5, positioned on the pitch 3 attempts to strike a projectile and send it over boundary 30. Typically, in cricket, two batsmen stand on opposite ends of the pitch. However, only one batsman bats at a time. Once a first batsman is out, the bowler switches sides and then bowls to the second batsman. When this happens the representation of the bat 5 switches to the opposite end of the pitch 3 and the representation of the boundary 30 rotates correspondingly. Architecture 7 remains in place. It is to be noted that from this or another screen, game, sports team, and/or sport player information may be accessed, such as information pertaining to the statistics of an individual athlete, for instance, by deselecting, e.g., via tapping on, the representation of the bat 5. As illustrated in FIG. 8, the bat 5 may be selected so as to bring up various statistics 9 pertaining to the batter, such as the batter's current or past boundaries.

FIGS. 9A and B show a status and/or notification bar 11A and 11B that may be compressed or expanded, respectively, e.g., by tapping or the like. User bet, statistic, profile information and/or the like may be displayed on the bars 11A, 11B. As shown in FIG. 10 the overall status of the match (e.g., match ended, lunch break, etc.) may be displayed as an overlay 13.

Figure 11:
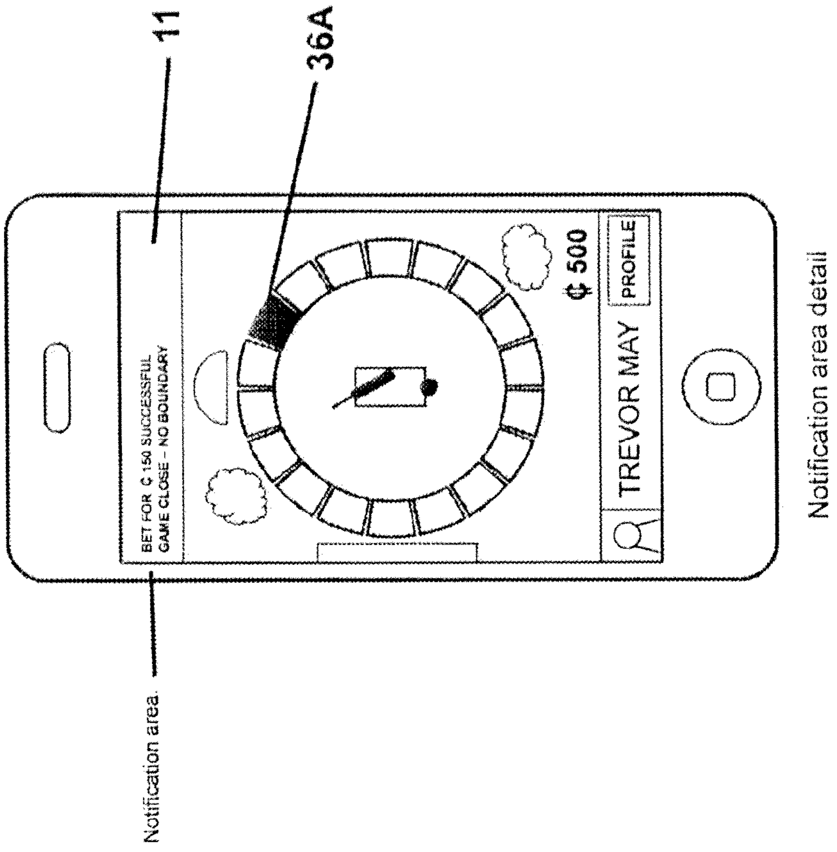

As shown in FIG. 11 an actual result indicating the actual boundary segment, e.g., 36A, that the projectile crosses may be displayed, and the result of the bet, e.g., won or loss, may also be indicated at the notification bar 11. Once winners have been allocated, the losers will have their accounts depleted in relation to the amounts of the bets they lost, and the winners will have their accounts increased in relation to the amounts of the bets they won. The bet money will stay on the pitch during the game where balls are being bowled at the batsman until a boundary of a four or six is scored and a bet is either won or lost. It will be appreciated by those skilled in the art that if the sport is a different sport from cricket, the bet being either won or lost will be determined at a suitable juncture of the game which depends on the nature and rules of the sport.

Another example of a sport to which the present system could be applied is baseball. In this case, a bet would be placed on whereabouts over the fence the ball will be hit when the next home run is scored. Thus the region of the fence inside the foul lines is divided into segments in a similar manner to the cricket boundary. A winning event would be placing the bet on the segment that the ball was determined to be hit into, as provided by the outcome data from one or more data providers 190 as previously described. Because the foul lines on a baseball pitch make a 90° region in which a home run ball can be hit, four baseball grounds can be provided within one overlaid roulette wheel. Thus a user of the client 500 can monitor and place bets on four baseball games simultaneously and can win or lose a bet on any of those games whenever a home run is scored on any of those games.

Another example of a sport to which the present system could be applied is golf. In this case, the putting green for a hole of a course would be divided up into areas and a user would place a bet on which area the ball of the next shot hit would end up. Thus a winning event would be when the golf ball's trajectory ends up within the particular area bet on. This could be determined from the outcome data from one or more data providers, particularly those with suitable camera feeds able to obtain a birds' eye view of the green. In this case, the display of the game could be generated to depict a representation of the green with the segments overlaid—they would not necessarily need to be shown around the outside of a roulette wheel as for cricket and baseball. Information would be generated from data provided by the one or more data providers 190 to inform the user of the gradient of each segment—this information could be included in the representation of the green and the odds could be varied in dependence on the gradient adversity in a particular area.

Another example of a sport to which the present system could be applied is horseracing. In this case, the racecourse would be divided into furlongs and fences, which could be represented with a roulette wheel overlaid as racecourses are generally circular. A user would place a bet on, for example, which horse will be ahead at the end of a particular furlong or on which fence a particular horse will fall etc. Thus a winning event would be placing a bet on the horse which is determined to be ahead at the end of a given furlong, or correct selection of a fence at which a particular horse falls. The information for determining a winning bet would be provided by outcome data from one or more data providers 190 as previously described. As well as variation based on previously-mentioned factors, the odds data in this case could be updated if, for example, a horse stumbles or the weather changes (racecourse becoming wet for example).

It will be appreciated that the system described could be implemented based on many more sports and that a suitable event on which users can bet would vary according to the sport. The system allows users to bet on a "micro event" within a sports game, not necessarily the final result of that game. The system allows repeated betting on events throughout the match or race and thus the user's interest is maintained by means of the visually interactive display generated and the continual use of outcome data. The events which users can bet on occur as a normal part of the sporting event and thus the system is most suited to for "in-play betting" rather than general "spot betting". The micro-events being bet on tend to be unpredictable in character.

Figure 14:
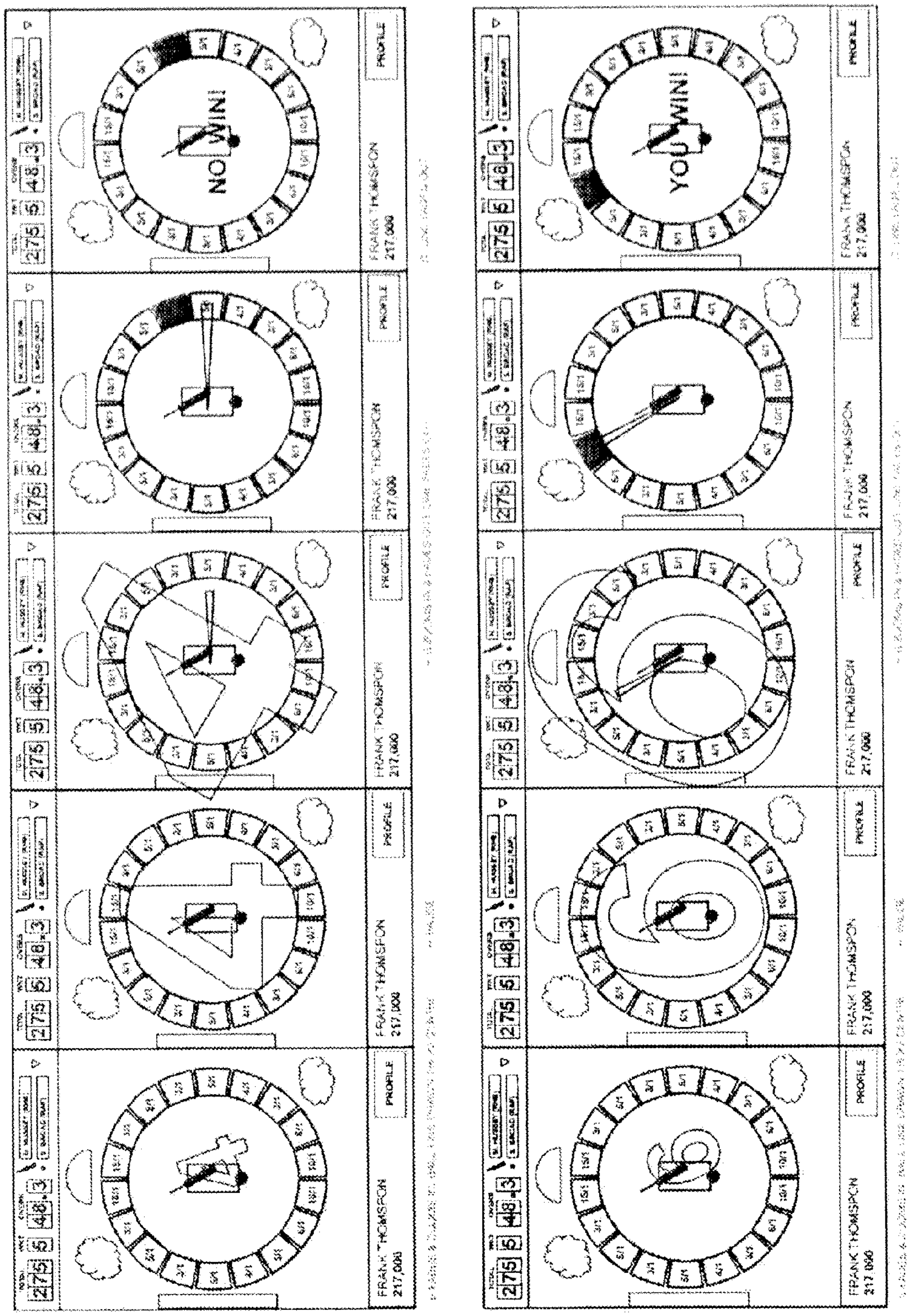

FIG. 14 illustrates the visual indication to the player once a boundary has been scored. In cricket, this could be either a 4 or a 6.

Figures 12A, 12B, 12C:
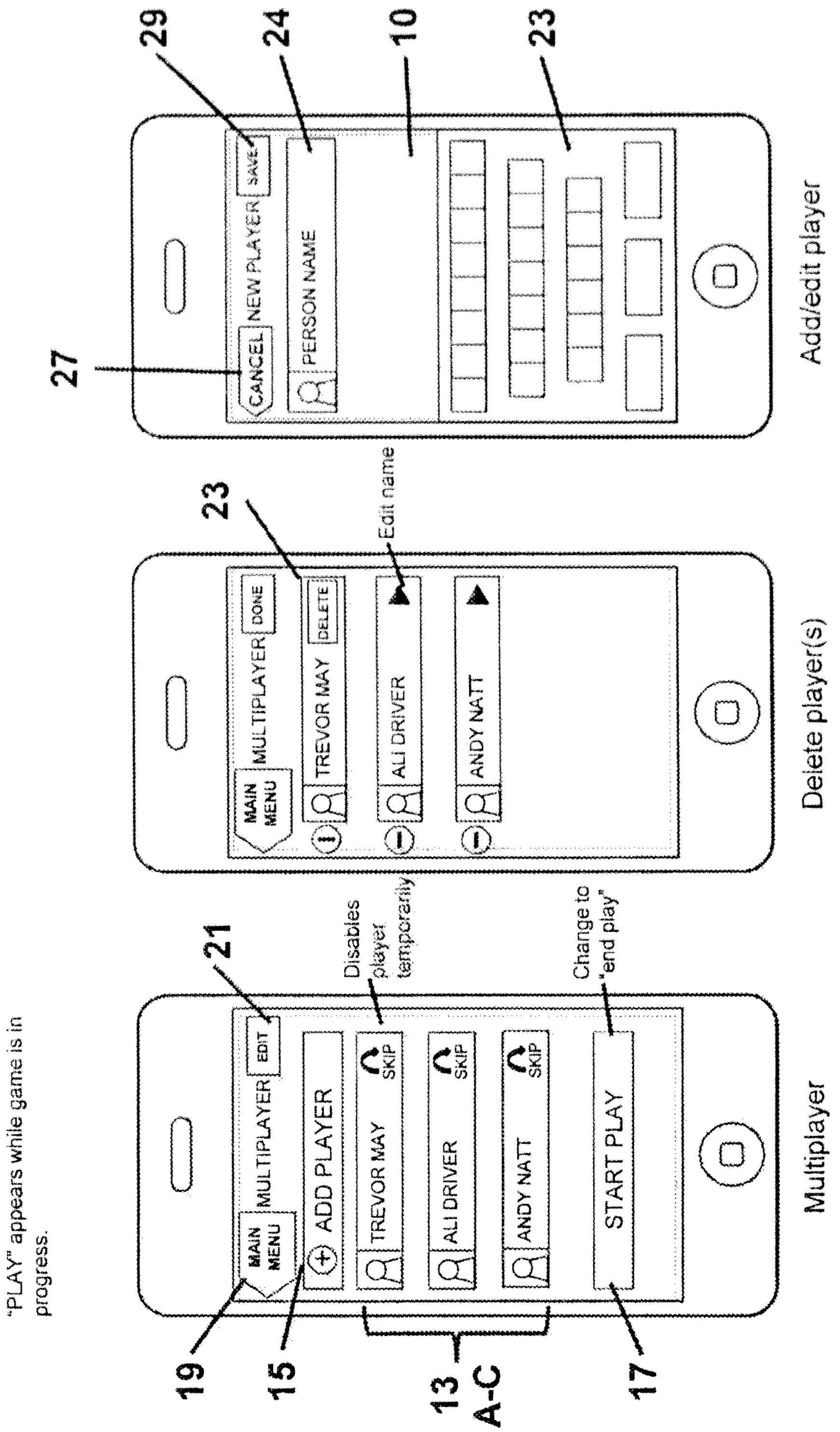

FIG. 12A-G illustrates a multiplayer mode for the game where players can play on a single device, as mentioned previously with reference to FIG. 5A. In this mode a plurality of users may play against one another as well as making bets with respect to which boundaries will be hit. For instance, FIG. 12A illustrates a plurality of boxes representing users 13A-C which may be added to the game. To add a player, the player's box may be selected, e.g., by tapping or toggling, and then the add player box 15 may be selected. Once the chosen players have been selected the start game box 17 may be selected so as to start the game. Also displayed on this screen may be the main menu 19 and add information 21 boxes. FIG. 12B illustrates that a player once selected to join a multiplayer game may be deselected by selecting the edit box 23.

FIG. 12C illustrates one embodiment pertaining to how information, such as information related to a player profile, may be added, for instance, by tapping on a representation of a keyboard 23 displayed on the screen 10. Once the player profile has been set up, the personal profile box 24 may also be displayed. Save and cancel boxes 27 and 29 may also be displayed for saving and/or cancelling entered data.

Figures 12D, 12E, 12F:
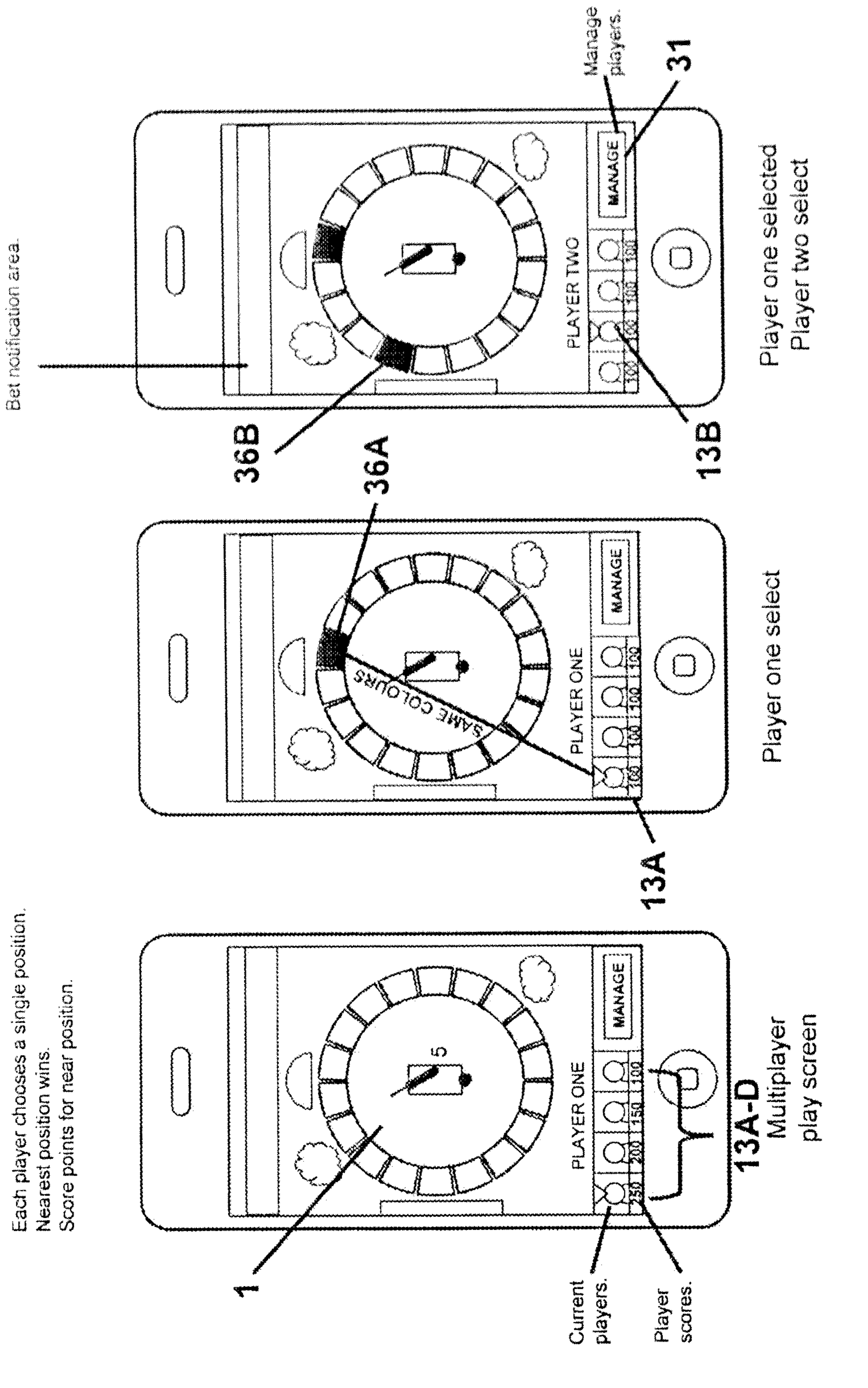

FIG. 12D illustrates a current multiplayer game wherein a representation of the field 1 is displayed along with current players 13A-D. It is noted that current player box 13 also indicates each player's score. As indicated in FIG. 12E, each player, e.g., 13A, is individually demarcated, such as by a selected colour, and given a turn to select a boundary and/or to make a wager thereon. The selection and/or bet of the player, e.g., 13A, will be demarcated by the same designation, e.g., colour, as the user.

As seen with respect to FIG. 12F, once one player has made a selection the next player, e.g., 13B, makes a selection 36B, in the manner set forth above. The players may be managed by a player manage box 31.

Figure 12G:
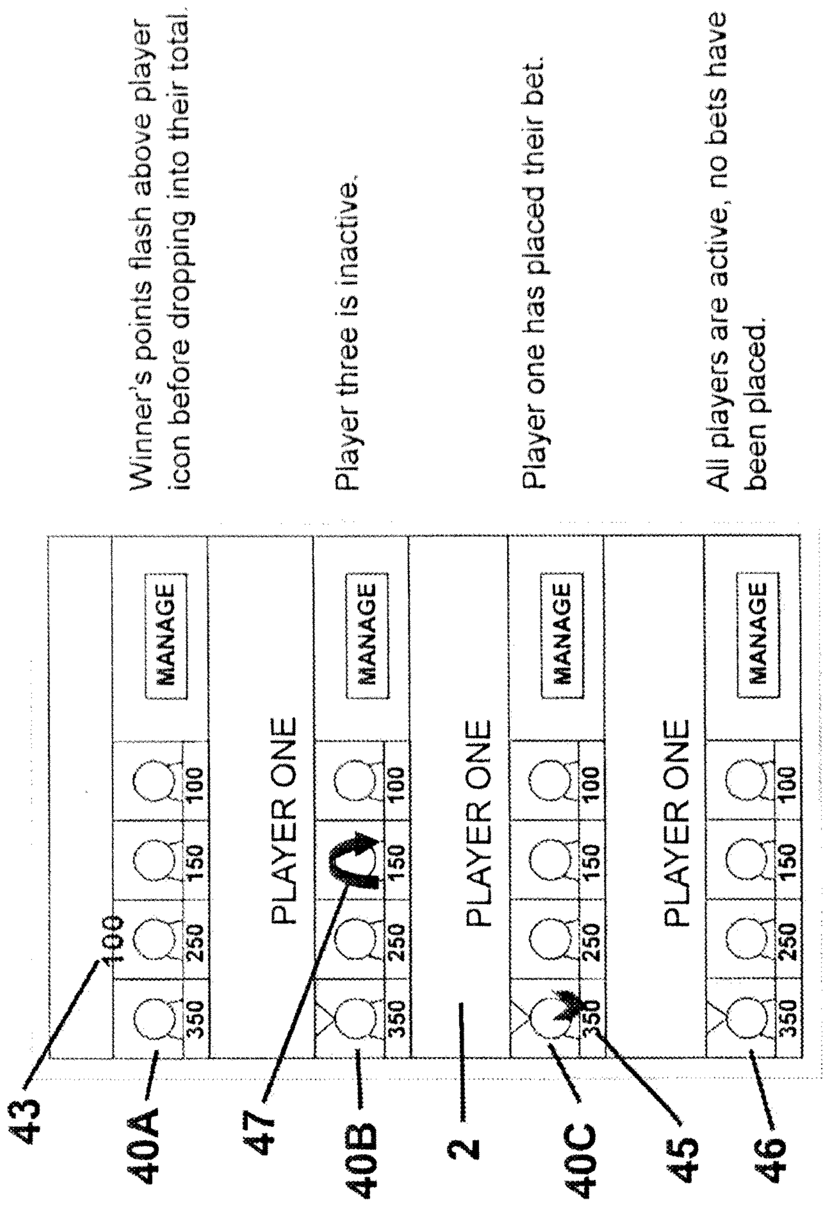

FIG. 12G illustrates the player manage screen 2. The player manage screen 2 illustrates the status of the various players in the multiplayer game. For instance, status bars 40A-C represents various embodiments of a status of a game. For example, at a status bar 40A the winning score 43 is displayed above the winning player's designated box. At a status bar 40B the activity level of the players is indicated. As indicated by a designation, player three 47 is inactive. At a status bar 40C a designation 45 indicates that player one has made a bet. A status bar 46 indicates that all players are active, but that no bets have been made.

Figure 15:
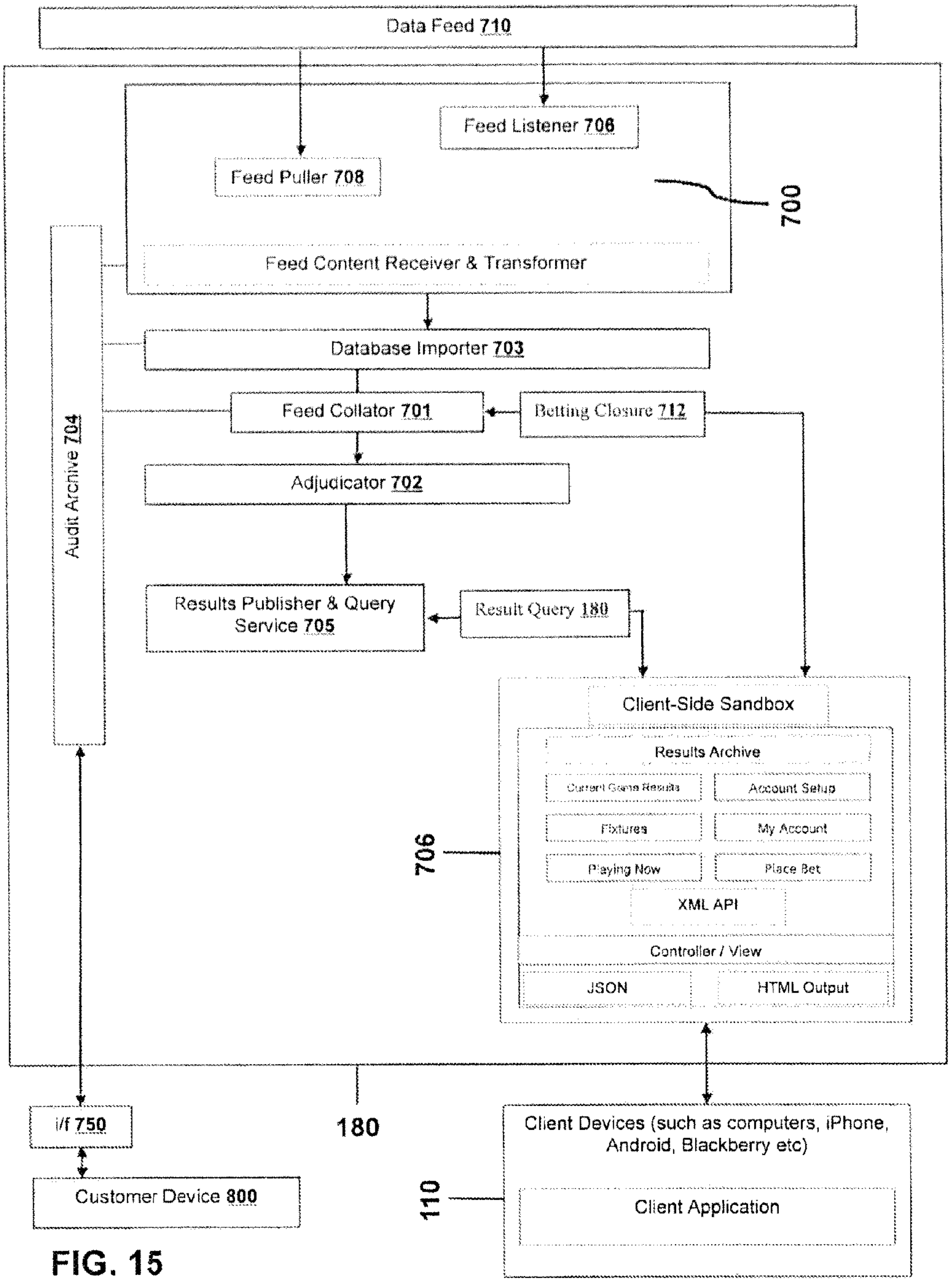
FIG. 15 illustrates the block diagram showing the functionality of the system.

FIG. 15 illustrates a block diagram showing the functionality of the computerised system used in embodiments of the invention. It will be appreciated by those skilled in the art that the various components of the system are shown for illustrative purposes but that in practice, some or all of the functions may be carried out by fewer or more hardware components such as various processors and memories or that some or all functions may be implemented in software.

In general terms, the figure shows a data feed 710 as input into the server 180. A first input/output into the server 180 is an exemplary client device 110. In practice, multiple client devices 110 could be connected to the server 180 via the network 150, but a single device is shown for simplicity. A second input/output to the server 180 is a customer device 800, via an interface 750. Again, multiple customer devices 800 could connect to the server 180 via a network such as the network 150, but a single device 180 is shown for illustrative purposes.

Within the server 180 is a feed content receiver and transformer 700, connected to a database importer 703, which in turn is connected to a feed collator 701. The feed collator 701 is connected to an adjudicator 702, which is also connected to a results publisher and query service 705.

Each of the feed content receiver and transformer 700, the database importer 703, the feed collator 701 and the results publisher and query service 705 are also shown to be connected to an audit archive 704. The above-mentioned first two-way connection to a customer device 800 is a connection into the audit archive 704. The feed collator 701 and the results publisher and query service 705 are also shown to be connected to a client-side module 706, which may be implemented as a sandbox. The above-mentioned second two-way connection to a client device 110 is a connection into the client-side module 706.

The feed content receiver and transformer 700 comprises a feed listener 706 and a feed puller 708. The feed listener 706 is configured to accept outcome data from a plurality of sources. Such sources may be input directly from sporting events organisers or be provided by reporting agencies. Outcome data such as for example sporting data, can be found in a number of places. In one embodiment the computerised system described herein takes one outcome data source or multiple outcome data sources at the same time. These one or more data sources are shown collectively as the data feed 710, which is derived from the third party data providers 190 shown in FIG. 2.

To ensure the very latest data has been taken the system adopts a "push/pull" technique whereby the feed content receiver and transformer 700 defines a minimum lag between each scheduled data update. The outcome data is "pushed" by the sources of outcome data to the feed content receiver 700 via the feed listener 706 at predefined variable intervals. The feed puller 708 is set to work at predefined variable intervals to extract i.e. "pull" the outcome data from the sources in the absence of the data being pushed.

In one such embodiment the computerised system as described herein uses a "feed puller" 708. The feed puller 708 pulls on a regular basis from each outcome source and takes the latest feed. If however an update is available between the scheduled "pull" update said listener interface 706 provides an alternative method for receiving the data and will accept an update on a "feed push" or ad-hoc basis, in dependence on when any particular data source has an update available and can schedule sending it to the server 180. This combination of the feed listener and feed pull allows the system to be provided with the very latest data available and reduces the time lag (or latency) that some updates may experience.

The feed puller and feed listener may push or pull data at an interval of approximately once a week, or once a day, or once every 3 hours, or once every hour, or once every minute, or once every 30 seconds, or once every 15 seconds, or h once every 10 seconds, or once every second, or once every 0.5 seconds. In a preferred embodiment the feed content receiver and transformer may push or pull data approximately every second. It will be understood by those skilled in the art that the feed listener 706 can be set up to receive data at this interval or any other suitable interval but that it may not actually receive data that often as receipt of data depends on data being sent from the data feed 710. The feed listener can be in a "ready" state to accept data whenever it is available, but in the event that a significant amount of data arrives at once, it may need to be buffered either in a buffer memory of the feed listener 706 or in a buffer of the data feed 710. The feed puller 708 can be set up to poll for data at any interval to maximise the speed of entry of new data into the system. It could be set up to poll for data at the same times as the feed listener 706 is set to receive data or it could be set up to poll at different times so as to increase the likelihood of picking up data between scheduled feeds from the data feed 710. Thus latency in the system is minimised.

Once the outcome data arrives into the system, the Feed Content Receiver and Transformer 700 manages the receipt of the outcome data and transforms the feed data into a common format for import and management within a database. This allows the system to accept multiple sources from different destinations and for those data feeds to be managed in a common way. For example, data packet headers are analysed so that different sizes and formats of packets can be stored in a common format.

Once the outcome data has been converted into a common format it is imported by the database importer 703 and is met by the feed collator 701 that observes the arrival of data. It will be understood that the "push/pull" system described above can give rise to duplication of data in the event that the feed puller 708 polls for data substantially simultaneously or some time before or after the feed listener 706 receives the same data. The feed collator 701 verifies that the correct information has been received to determine a result of an event, filters out any duplicated data and ensures no "gaps" in the data exist. If any data is missing, for example data from a particular data source or part of the necessary data from a particular source, the feed collator 701 requests the missing data—this request is passed up via the database importer 703 and the feed content receiver and transformer 700 and out to the relevant data provider through the data feed 710. When the missing data is subsequently received, it is collated with the existing data for that particular result. The feed collator 701 also takes into account information on closure of betting for a particular event to assist in matching data from an outcome to the timeframe in which game players were placing bets. This betting closure input is shown as a box 712 in the connection between the feed collator 701 and the client-side module 706. Thus the feed collator 701 produces a single set of data for each event on which betting has occurred, which can then be transmitted on within the system.

Having produced a set of data, the feed collator 701 transmits the data to the adjudicator 702. When a certain set of configured criteria is satisfied which will determine whether a specific outcome has been achieved for example an event such as a boundary being scored in cricket, the feed collator 701 than notifies the adjudicator that such an outcome has been achieved. Thus this notification is transmitted as part of the data for a particular result, although it could be transmitted separately.

If data has been received which turns out not to relate to a result of a micro-event (e.g. a ball has been hit but a boundary has not been scored), the data can be sent directly to the client-side module 706, which can then send a message to the client devices informing them that betting is still on for the next micro-event.

The adjudicator 702 considers the notifications provided by the feed collator 701. The consideration determines whether sufficient reliable information exists to provide a result. When the criteria have been satisfied the adjudicator will determine the result based on the feed data, the source of the data and a set of rules. The rules may use information relating to the reliability of the data source to affect how much influence that data source has on the result, as previously described.

When the adjudicator 702 has arrived at a result the result will be published through the system by the Results Publisher & Query Service 705 to provide an interface for querying and reporting on results, as described below. The result is also transmitted to client devices 110, via the client-side module 706. This result can be provided as soon as it is ready and/or in response to a result query from the module 706 (as shown in a box 714). The result is provided to the client-side module 706.

The client-side module 706 manages and stores data published from the system such as fixtures and game results alongside the client specific data such as account information and profile data. This managing and storing of data is shown as various functions in FIG. 15—results archive, current game results (up to date storage of the scores and events which have been or can be bet on for all sports events currently live for betting), account setup (allows multiple users to set up accounts with the system), fixtures (a database of sporting events which can be bet on using the system), my account (storing and manipulation of data specific to each user, including their credit), playing now (a database of sporting events which can be bet on at any particular time) and place bet (allows users to input a bet into the system, manipulates betting information and determines results for each user). The client-side module also manages bet-placing data in so far as it determines when to place bets on the next micro-event and when it is too late for the next micro-event and bets must be carried over to the subsequent micro-event.

All data within the client-side module 706 is then fed through an XML API to ensure the language is correct for the client device, such as JSON or HTML. Thus the server 180 can interface with multiple client devices 110.

The module 706 compares the result data provided by the adjudicator to bet data received from the client devices 110 and determines which bets have won and which have lost. The module 706 sends a message to each client device 110 to inform the user of the device whether they have won or lost a bet and this is displayed on the client device 110. An example of a possible display has been previously described with respect to FIG. 14. The module 706 archives all results and also updates each user's account with the credits or money won or lost according to whether the bet has been won or lost. In this way, each user of a client device 110 can be informed of their current credit and can also request information on their credit by querying the "my account" function.

It can be understood that not all the data coming into the system will relate directly to a result which can be bet on but rather, the data will include non-result data, for example with respect to cricket, an indication of what happens each time a ball is bowled, even if the ball is not hit to the boundary. The feed collator 701 analyses each set of incoming data to determine whether or not it relates to a result which is open for betting on. If it does, the procedure described above of passing the data onto the adjudicator is implemented. If it does not, the data can be sent directly to the module 706 for archiving and for passing onto the client devices 110. For example, a message can be sent to the client devices 110 informing the users that a certain number of runs were scored off the last ball, or that a batsman is out. Thus users can keep track of the game on their device even though the events being reported do not constitute a result of any bet they have placed.

Throughout the data journey a full auditable archive 704 monitors and logs each new piece of data. The archive provides a source of data for verifying the integrity of the processes and data within the system and can be called up at any time. Because of its various connections to other functions within the server 180 it is able to receive all the data it needs to create a historical archive of the outcomes from multiple sporting events and which users won and lost bets on which events within each sporting event. In particular, the audit archive 704 receives results of events from the results publisher and query service 705. The audit archive 704 can then be queried by a customer device 800 via the customer interface 750. A user of a customer device 800 might be different from a user of a client device 110. For example, it may be a betting company that uses the system and wants to find out statistics on the betting results for its clients. Thus the interface 750 may be set up as a different access route into the server 180 than is used by client devices 110, although in practice it could be provided using the same hardware. The interface 750 is set up to access the audit archive 704, whereas in the arrangement of FIG. 15, client devices 110 access the server 180 via the module 706.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Although the description above refers to a client and a server, other frameworks and architectures may be used as well. For example, the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components.

As used herein, the term "user" may refer to any entity including a person or a computer. The system and methods disclosed herein may also be implemented as a computerised system for playing a betting game, the system comprising a game server and a plurality of game clients. The game server is configured for receiving match data in real time relating to the playing of a sports match from a data server and bet-placing data from the game clients. The sport involves the repeated projection of at least one object by one or more players in a variable direction relative to a field of play towards a boundary of the field of play, and the match data comprises data fields relating to each individual projection, including an actual portion of the boundary where the object crosses the boundary. Each game client is configured to transmit the bet data to the game server, the bet data identifying a given individual projection and bet type that is associated with one or more portions of the boundary. The game server is configured to compare the bet data received from the game clients with the match data and to identify given bet data as constituting a winning bet if the bet type corresponds to the actual portion of the boundary in the match data for the given individual projection or else to identify the bet data as constituting a losing bet. The individual projection in the bet data can be the next projection.

The foregoing description is intended to illustrate but not to limit the scope of the invention, which is defined by the scope of the appended claims. Other embodiments are within the scope of the following claims. The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

What is claimed is:

1. A computer-implemented apparatus for running a betting game in which users can bet on a micro-event which occurs during a sporting event, the apparatus comprising:

a feed content receiver and transformer arranged to receive micro-event data in real time relating to a sporting event, which sporting event involves the repeated occurrence of a micro-event in variable regions of a field of play and the micro-event data comprising data fields relating to each individual occurrence and including an identification of an actual region of the field of play where the micro-event occurs;

an adjudicator arranged to:

determine a result of the micro-event using the micro-event data and a set of stored rules; and a client-side module arranged to:

receive bet-placing data from one or more users, the bet-placing data identifying a given individual occurrence of a micro-event and a bet type that are associated with a region of the field of play; and compare said received bet data with said determined result and to identify given bet data as constituting a winning bet if the bet type corresponds to the actual region of the field of play in the micro-event data for said given individual occurrence or else to identify said bet data as constituting a losing bet;

a feed collator arranged to:

determine whether a complete set of data relating to the micro-event has been received and if any data is missing, request the missing data; and receive any requested missing data, wherein the feed collator is further arranged to determine whether received micro-event data relates to a result of a micro-event and if the micro-event data does, send collated data for that microevent to the adjudicator and otherwise send the collated data to the client-side module with an indication that bets can be re-opened for the next micro-event.

2. The apparatus of claim 1, wherein the feed collator is further arranged to:

determine whether any duplicate data relating to the micro-event has been received and if any has been received, process to leave remaining data; and collate the remaining data and any received missing data, and wherein the adjudicator is arranged to use the collated micro-event data.

3. The apparatus of claim 1, wherein the feed content receiver and transformer comprises:

a feed listener arranged to receive micro-event data from a data feed when new micro-event data is available; and a feed puller arranged to poll a data feed for new micro-event data.

4. The apparatus of claim 3, wherein the feed listener is arranged to receive micro-event data from a data feed at regular intervals determined by a data source providing data through the data feed.

5. The apparatus of claim 3, wherein the feed puller is arranged to poll a data feed at regular time intervals.

6. The apparatus of claim 5, wherein the feed puller is arranged to poll a data feed at times which differ from the times at which the feed listener is arranged to receive micro-event data.

7. The apparatus according to claim 1, wherein the feed collator is arranged to transmit data to the adjudicator.

8. The apparatus according to claim 1, wherein the feed content receiver and transformer is arranged to receive data from multiple data sources and transform the data into a common format for use by the feed collator.

9. The apparatus according to claim 1, wherein the feed collator is arranged to use bet-placing data or information derived therefrom in the said determination.

10. The apparatus according to claim 1, wherein the stored rules used by the adjudicator comprise rules relating to reliability of a data source.

11. The apparatus according to claim 10, wherein the adjudicator is arranged to continually or at intervals update the rules in dependence on the quality of data received from a data source.

12. The apparatus according to claim 1, wherein the client-side module is arranged to accept bet-placing data in respect of a next micro-event prior to the occurrence of the next micro-event and to determine when betting for the next micro-event is closed.

13. The apparatus according to claim 12, wherein the client-side module is further arranged to apply a bet to the next micro-event if betting for that micro-event is still open or otherwise to apply the bet to a subsequent micro-event.

14. The apparatus according to claim 1, wherein the client-side module is arranged to accept bet-placing data in respect of a next micro-event prior to the occurrence of the next micro-event and to determine when betting for the next micro-event is closed and wherein the client-side module is arranged to provide bet-placing data or information derived therefrom to the feed collator and to use data provided from the adjudicator or the feed collator to determine whether to re-open an existing bet or to open a new bet for the next microevent.

15. The apparatus of claim 1, wherein the sports event is:

cricket and the said repeated occurrence of a micro-event is a ball being hit to the boundary of the field and the said region of the field of play is a portion of the boundary;

baseball and the said repeated occurrence of a micro-event is a home run being hit and the said region of the field of play is a portion of the fence;

golf and the said repeated occurrence of a micro-event is a ball being hit onto the putting green and the said region of the field of play is an area of the green; or horseracing and the said repeated occurrence of a micro-event is a horse arriving or falling and the said region of the field of play is the end of a furlong or a fence.

16. A computer-implemented apparatus for running a betting game in which users can bet on a micro-event which occurs during a sporting event, the apparatus comprising:

a feed content receiver and transformer arranged to receive micro-event data in real time relating to a sporting event, which sporting event involves the repeated occurrence of a micro-event in variable regions of a field of play and the micro-event data comprising data fields relating to each individual occurrence and including an identification of an actual region of the field of play where the micro-event occurs;

an adjudicator arranged to:

determine a result of the micro-event using the micro-event data and a set of stored rules; and a client-side module arranged to:

receive bet-placing data from one or more users, the bet-placing data identifying a given individual occurrence of a micro-event and a bet type that are associated with a region of the field of play; and compare said received bet data with said determined result and to identify given bet data as constituting a winning bet if the bet type corresponds to the actual region of the field of play in the micro-event data for said given individual occurrence or else to identify said bet data as constituting a losing bet;

wherein said micro-event involves the projection of at least one object by one or more players in a variable direction relative to a field of play towards a boundary of said field of play, and said micro-event data comprises data fields relating to each individual projection, including an actual portion of the boundary where the object crosses said boundary, such that the said repeated occurrence of a micro-event is the crossing of the boundary and the said region of a field of play is the portion of the boundary.

17. The apparatus of claim 16, further comprising a feed collator arranged to:

determine whether a complete set of data relating to the micro-event has been received and if any data is missing, request the missing data; and receive any requested missing data.

18. The apparatus of claim 17, wherein the feed collator is further arranged to:

determine whether any duplicate data relating to the micro-event has been received and if any has been received, process to leave remaining data; and collate the remaining data and any received missing data, and wherein the adjudicator is arranged to use the collated micro-event data.

19. The apparatus of claim 18, wherein the feed listener is arranged to receive micro-event data from a data feed at regular intervals determined by a data source providing data through the data feed.

20. The apparatus of claim 19, wherein the feed puller is arranged to poll a data feed at times which differ from the times at which the feed listener is arranged to receive micro-event data.

21. The apparatus of claim 18, wherein the feed puller is arranged to poll a data feed at regular time intervals.

22. The apparatus according to claim 17, wherein the feed collator is arranged to transmit data to the adjudicator.

23. The apparatus according to claim 17, wherein the feed content receiver and transformer is arranged to receive data from multiple data sources and transform the data into a common format for use by the feed collator.

24. The apparatus according to claim 23, wherein the feed collator is arranged to use bet-placing data or information derived therefrom in the said determination.

25. The apparatus according to claim 23, wherein the client-side module is arranged to accept bet-placing data in respect of a next micro-event prior to the occurrence of the next micro-event and to determine when betting for the next micro-event is closed and wherein the client-side module is arranged to provide bet-placing data or information derived therefrom to the feed collator and to use data provided from the adjudicator or the feed collator to determine whether to re-open an existing bet or to open a new bet for the next microevent.

26. The apparatus according to claim 17, wherein the feed collator is further arranged to determine whether received micro-event data relates to a result of a micro-event and if the micro-event data does, send collated data for that micro-event to the adjudicator and otherwise send the collated data to the client-side module with an indication that bets can be re-opened for the next micro-event.

27. The apparatus according to claim 26, wherein the adjudicator is arranged to continually or at intervals update the rules in dependence on the quality of data received from a data source.

28. The apparatus of claim 16, wherein the feed content receiver and transformer comprises:

a feed listener arranged to receive micro-event data from a data feed when new micro-event data is available; and a feed puller arranged to poll a data feed for new micro-event data.

29. The apparatus according to claim 16, wherein the stored rules used by the adjudicator comprise rules relating to reliability of a data source.

30. The apparatus according to claim 29, wherein the client-side module is further arranged to apply a bet to the next micro-event if betting for that micro-event is still open or otherwise to apply the bet to a subsequent micro-event.

31. The apparatus according to claim 16, wherein the client-side module is arranged to accept bet-placing data in respect of a next micro-event prior to the occurrence of the next micro-event and to determine when betting for the next micro-event is closed.

32. The apparatus of claim 16, wherein the sports event is:

cricket and the said repeated occurrence of a micro-event is a ball being hit to the boundary of the field and the said region of the field of play is a portion of the boundary;

baseball and the said repeated occurrence of a micro-event is a home run being hit and the said region of the field of play is a portion of the fence;

golf and the said repeated occurrence of a micro-event is a ball being hit onto the putting green and the said region of the field of play is an area of the green; or horseracing and the said repeated occurrence of a micro-event is a horse arriving or falling and the said region of the field of play is the end of a furlong or a fence.

33. A non-transitory, computer-readable medium comprising a program which can be executed to implement the following steps to run a betting game in which users can bet on a micro-event which occurs during a sporting event:

receiving micro-event data in real time relating to a sporting event, which sporting event involves the repeated occurrence of a micro-event in variable regions of a field of play and the micro-event data comprising data fields relating to each individual occurrence and including an identification of an actual region of the field of play where the micro-event occurs;

determining a result of the micro-event using the micro-event data and a set of stored rules;

receiving bet-placing data from one or more users, the bet-placing data identifying a given individual occurrence of a micro-event and a bet type that are associated with a region of the field of play; and comparing said received bet data with said result to identify given bet data as constituting a winning bet if the bet type corresponds to the actual region of the field of play in the micro-event data for said given individual occurrence or else to identify said bet data as constituting a losing bet, determining whether a complete set of data relating to the micro-event has been received and if any data is missing, requesting the missing data; and receiving any requested missing data, determining whether the received micro-event data relates to a result of a micro-event and if the micro-event data does, send collated data for that microevent to the adjudicator and otherwise send the collated data to the client-side module with an indication that bets can be re-opened for the next micro-event.

34. A non-transitory, computer-readable medium comprising a program which can be executed to implement the following steps to run a betting game in which users can bet on a micro-event which occurs during a sporting event:

receiving micro-event data in real time relating to a sporting event, which sporting event involves the repeated occurrence of a micro-event in variable regions of a field of play and the micro-event data comprising data fields relating to each individual occurrence and including an identification of an actual region of the field of play where the micro-event occurs;

determining a result of the micro-event using the micro-event data and a set of stored rules;

receiving bet-placing data from one or more users, the bet-placing data identifying a given individual occurrence of a micro-event and a bet type that are associated with a region of the field of play; and comparing said received bet data with said result to identify given bet data as constituting a winning bet if the bet type corresponds to the actual region of the field of play in the micro-event data for said given individual occurrence or else to identify said bet data as constituting a losing bet, determining whether a complete set of data relating to the micro-event has been received and if any data is missing, requesting the missing data; and receiving any requested missing data, determining whether the received micro-event data relates to a result of a micro-event and if the micro-event data does, send collated data for that microevent to the adjudicator and otherwise send the collated to the client-side module with an indication that bets can be re-opened for the next micro-event projecting at least one object by one or more players in a variable direction relative to the field of play towards a boundary of said field of play, wherein said micro-event data comprises data fields relating to each individual projection, including an actual portion of the boundary where the object crosses said boundary, such that the said repeated occurrence of a micro-event is the crossing of the boundary and the said region of a field of play is the portion of the boundary.

* * * * *